(12) United States Patent
Uchida et al.

(10) Patent No.: US 12,080,967 B2
(45) Date of Patent: Sep. 3, 2024

(54) COVER DEVICE FOR MOTOR TERMINAL

(71) Applicant: DENSO CORPORATION, Kariya (JP)

(72) Inventors: Takuma Uchida, Kariya (JP);
Takamitsu Kubota, Kariya (JP)

(73) Assignee: DENSO CORPORATION, Kariya (JP)

( * ) Notice: Subject to any disclaimer, the term of this patent is extended or adjusted under 35 U.S.C. 154(b) by 419 days.

(21) Appl. No.: 17/525,363

(22) Filed: Nov. 12, 2021

(65) Prior Publication Data

US 2022/0077618 A1    Mar. 10, 2022

Related U.S. Application Data

(63) Continuation of application No. PCT/JP2020/021136, filed on May 28, 2020.

(30) Foreign Application Priority Data

Jun. 7, 2019   (JP) ................. 2019-106888

(51) Int. Cl.
*H01R 13/11* (2006.01)
*H01R 13/533* (2006.01)
*H02K 5/22* (2006.01)

(52) U.S. Cl.
CPC .......... *H01R 13/11* (2013.01); *H01R 13/533* (2013.01); *H02K 5/225* (2013.01); *H01R 2201/10* (2013.01)

(58) Field of Classification Search
CPC .. H01R 13/11; H01R 13/533; H01R 2201/10; H01R 13/115; H02K 5/225; F02D 9/02; F02D 9/10
See application file for complete search history.

(56) References Cited

U.S. PATENT DOCUMENTS

2017/0279204 A1*  9/2017  Kudo ................. H01R 4/2429

FOREIGN PATENT DOCUMENTS

JP          2002-295272        10/2002

* cited by examiner

*Primary Examiner* — Tulsidas C Patel
*Assistant Examiner* — Joshua Kiel M Rodriguez
(74) *Attorney, Agent, or Firm* — Nixon & Vanderhye P.C.

(57) ABSTRACT

A cover device includes a terminal receiving portion and a terminal member while the terminal member is received in the terminal receiving portion. In the terminal member, a third wall connects between one end portion of a first wall, which is directed in an inserting direction of a motor terminal into the terminal receiving portion, and one end portion of a second wall, which is directed in the inserting direction. A length of the third wall, which is measured in a direction directed from a first connection between the first wall and the third wall to a second connection between the second wall and the third wall, is longer than a distance between the first connection and a second inner peripheral surface of the terminal receiving portion and is longer than a length between the second connection and a first inner peripheral surface of the terminal receiving portion.

7 Claims, 15 Drawing Sheets

COVER DEVICE FOR MOTOR TERMINAL

CROSS REFERENCE TO RELATED APPLICATIONS

This application is a continuation application of International Patent Application No. PCT/JP2020/021136 filed on May 28, 2020, which designated the U.S. and claims the benefit of priority from Japanese Patent Application No. 2019-106888 filed on Jun. 7, 2019. The entire disclosures of all of the above applications are incorporated herein by reference.

TECHNICAL FIELD

The present disclosure relates to a cover device for a motor terminal.

BACKGROUND ART

Previously, various types of cover devices for covering a power supply terminal (hereinafter referred to as a motor terminal) of an electric motor have been proposed. As one such a cover device, there has been proposed a throttle cover having terminal bases. Each of the terminal bases is configured to receive the motor terminal, and the terminal base has a wall that is U shaped in a cross section thereof and has an opening. The terminal base includes a connection terminal and a pressure contact terminal. The connection terminal serves as a wiring connected to a connector portion. The pressure contact terminal is received in a hole surrounding by the wall of the terminal base and is crimped together with the connection terminal. The pressure contact terminal is configured to be in pressure contact with the motor terminal inserted into the terminal base. When the motor terminal is inserted into the terminal base, the motor terminal is urged in a direction generally perpendicular to an inserting direction of the motor terminal by a pressure-contact portion of the pressure contact terminal, which has a spring property, so that the motor terminal comes in pressure contact with the pressure contact terminal and is thereby electrically connected to the connector portion through the pressure contact terminal and the connection terminal.

SUMMARY

According to one aspect of the present disclosure, there is provided a cover device that includes a terminal receiving portion and a terminal member. The terminal member includes a first wall, a second wall, a third wall and a pressure-contact portion. The first wall is arranged along a first inner peripheral surface of the terminal receiving portion. The second wall is arranged along a second inner peripheral surface of the terminal receiving portion, which is opposed to the first inner peripheral surface. The third wall connects between one end portion of the first wall, which is directed in an inserting direction of the motor terminal into the terminal receiving portion, and one end portion of the second wall, which is directed in the inserting direction of the motor terminal. The pressure-contact portion is configured to urge a motor terminal against the first wall. The pressure-contact portion is joined to another end portion of the second wall, which is directed in an opposite direction being opposite to the inserting direction. The pressure-contact portion is shaped to be bent from the second wall such that the pressure-contact portion progressively approaches toward the first wall away from the second wall until a turning point and then progressively approaches back toward the second wall away from the first wall as the pressure-contact portion extends in the inserting direction.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Figure 1:
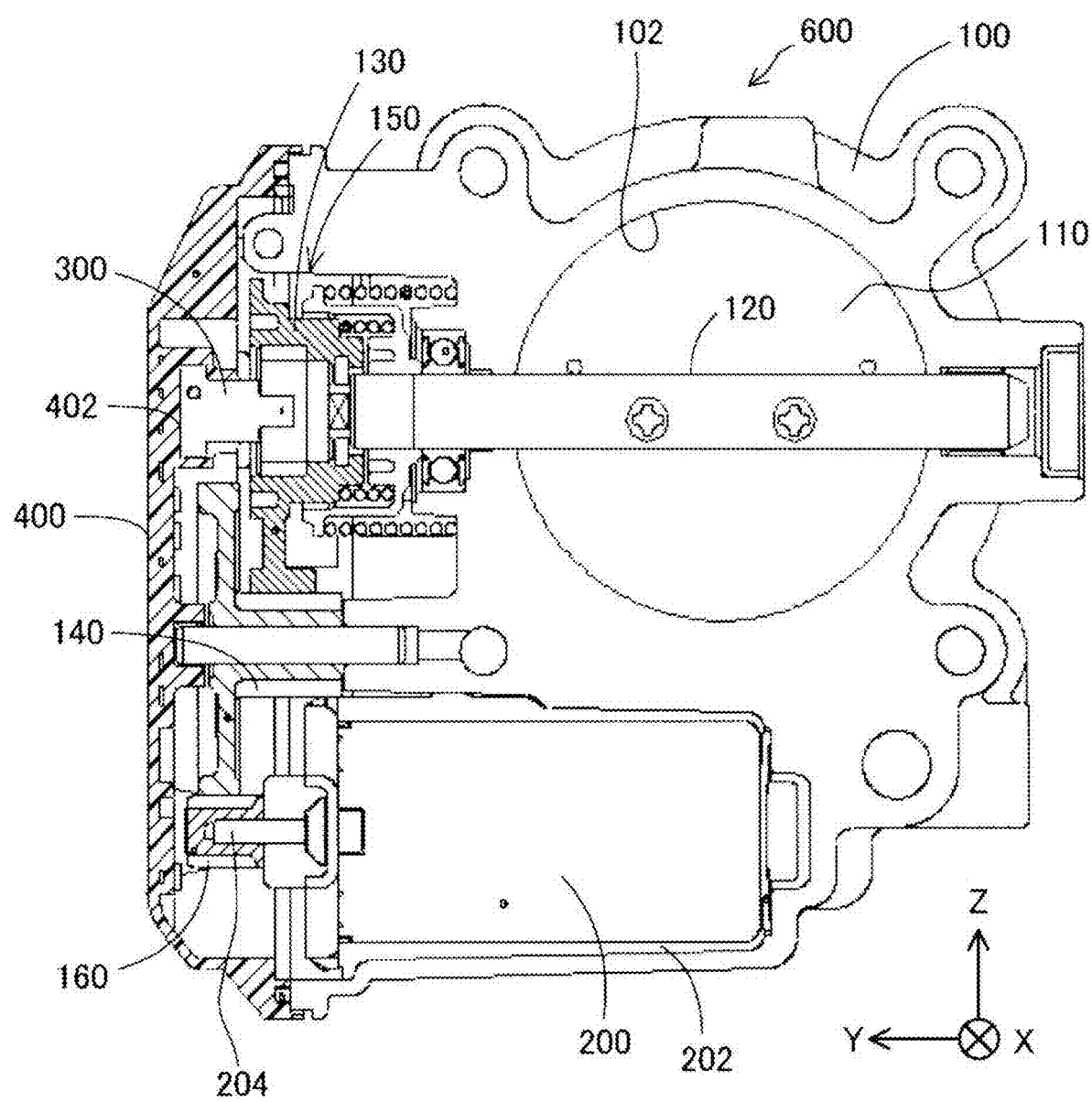
FIG. 1 is a cross-sectional view showing a throttle apparatus including a throttle cover to which cover devices according to an embodiment of the present disclosure are applied.

Previously, various types of cover devices for covering a power supply terminal (hereinafter referred to as a motor terminal) of an electric motor have been proposed. As one such a cover device, there has been proposed a throttle cover having terminal bases. Each of the terminal bases is configured to receive the motor terminal, and the terminal base has a wall that is U shaped in a cross section thereof and has an opening. The terminal base includes a connection terminal and a pressure contact terminal. The connection terminal serves as a wiring connected to a connector portion. The pressure contact terminal is received in a hole surrounding by the wall of the terminal base and is crimped together with the connection terminal. The pressure contact terminal is configured to be in pressure contact with the motor terminal inserted into the terminal base. When the motor terminal is inserted into the terminal base, the motor terminal is urged in a direction generally perpendicular to an inserting direction of the motor terminal by a pressure-contact portion of the pressure contact terminal, which has a spring property, so that the motor terminal comes in pressure contact with the pressure contact terminal and is thereby electrically connected to the connector portion through the pressure contact terminal and the connection terminal.

Under a high vibration environment, in which high vibration is generated in response to the operation of the electric motor, a terminal member (e.g., the pressure contact terminal), which is received in the hole formed by the wall, may be vigorously vibrated upward and downward in an extending direction of the hole, i.e., in a direction parallel to the inserting direction of the motor terminal. Thus, wear of the components of the cover device (e.g., wear of the terminal member and wear of a conductive member, such as the connection terminal in contact with the terminal member) may occur. This type of disadvantage is not limited to the throttle cover but is common to various types of cover devices that cover the motor terminal and electrically connect the motor terminal to an external device. Therefore, a technique, which can suppress the wear of the cover device caused by the operation of the electric motor, is desired.

The present disclosure can be implemented in the following form.

According to one aspect of the present disclosure, there is provided a cover device that is configured to cover a motor terminal of an electric motor and electrically connect the motor terminal to an external device. The cover device includes: a terminal receiving portion that is in a form of a recess and has a plurality of inner peripheral surfaces, wherein the terminal receiving portion is configured such that the motor terminal is insertable into the terminal receiving portion, and a conductive member, which is configured to be electrically connected to the external device, is exposed at one or more of the plurality of inner peripheral surfaces; and a terminal member that is flexible and is formed by a bent metal plate, wherein the terminal member is received in the terminal receiving portion and is configured to contact a portion of the conductive member exposed at the one or more of the plurality of inner peripheral surfaces, and the terminal member comes into pressure contact with the motor terminal when the motor terminal is inserted into the terminal receiving portion, wherein: the terminal member includes: a first wall that is arranged along a first inner peripheral surface, which is one of the one or more of the plurality of inner peripheral surfaces at which the conductive member is exposed; a second wall that is arranged along a second inner peripheral surface which is opposed to the first inner peripheral surface; a third wall that connects between one end portion of the first wall, which is directed in an inserting direction of the motor terminal into the terminal receiving portion, and one end portion of the second wall, which is directed in the inserting direction of the motor terminal; and a pressure-contact portion that is configured to urge the motor terminal against the first wall, wherein the pressure-contact portion is joined to another end portion of the second wall, which is directed in an opposite direction being opposite to the inserting direction, and the pressure-contact portion is shaped to be bent from the second wall such that the pressure-contact portion progressively approaches toward the first wall away from the second wall until a turning point and then progressively approaches back toward the second wall away from the first wall as the pressure-contact portion extends in the inserting direction; and a length of the third wall, which is measured in a direction directed from a first connection between the first wall and the third wall to a second connection between the second wall and the third wall, is longer than a distance between the first connection and the second inner peripheral surface and is longer than a length between the second connection and the first inner peripheral surface.

In the cover device according to the above aspect, the length of the third wall, which is measured in the direction directed from the first connection, which connects between the end portion of the first wall and an end portion of the third wall, to the second connection, which connects between an end portion of the second wall and an end portion of the third wall, is longer than the distance between the first connection and the second inner peripheral surface and is longer than the distance between the second connection and the first inner peripheral surface. Therefore, when the motor terminal vibrates in the inserting direction or the opposite direction opposite to the inserting direction, one of the two opposite end portions of the third wall, which are opposite to each other in the direction along a line connecting between the first connection and the second connection, abuts against the second inner peripheral surface or the first inner peripheral surface, and thereby the vibration of the third wall in the opposite direction, which is opposite to the inserting direction, is suppressed. Thus, the vibration of the terminal member can be suppressed, and the wear of the cover device caused by the operation of the electric motor can be suppressed.

The present disclosure can be implemented in various other forms other than the cover device. For example, the present disclosure may be implemented in a form of a throttle cover, a form of a terminal member for the cover device or the like.

Hereinafter, various embodiments of the present disclosure will be described with reference to the drawings.

A. First Embodiment

A1. Device Structure

A throttle apparatus 600 shown in FIG. 1 is installed on a vehicle and adjusts the amount of air (air intake amount) supplied to the engine according to the amount of depression of an accelerator pedal (not shown) under the control of an ECU (Engine Control Unit). Specifically, when the amount of depression of the accelerator pedal is notified to the ECU, which controls the throttle apparatus 600, through a communication network on the vehicle, the ECU adjusts a valve opening degree of a throttle valve 110 by controlling a rotational speed of an electric motor 200 for driving the throttle valve 110 based on the amount of depression of the accelerator pedal. At this time, a valve opening degree sensor 300 senses the valve opening degree and notifies a measurement value of the opening degree to the ECU. The ECU executes feedback control of rotation of the electric motor 200 based on the measurement value of the opening degree of the throttle valve 110 notified from the valve opening degree sensor 300.

As shown in FIG. 1, the throttle apparatus 600 includes: a throttle body 100 which is arranged in an air intake passage of an internal combustion engine; the throttle valve 110 which adjusts the amount of intake air of the engine; a shaft 120; the electric motor 200 which generates a torque when an electric power is supplied to the electric motor 200; a gear train 150; the valve opening degree sensor 300 which senses the opening degree of the throttle valve 110; and a throttle cover 400. In FIG. 1, an X axis, a Y axis and a Z axis, which are perpendicular to each other, are indicated. The X axis, the Y axis and the Z axis of the other drawings correspond to the X axis, the Y axis and the Z axis of FIG. 1.

The throttle body 100 forms a main body of the throttle apparatus 600. An air passage 102, which is shaped in a cylindrical form and conducts the intake air therethrough, is formed at an inside of the throttle body 100. The throttle valve 110 is fixed to the shaft 120. The shaft 120 is configured to rotate about a central axis of the shaft 120. Therefore, the throttle valve 110 is rotated together with the shaft 120. The throttle valve 110 adjusts the opening degree of the air passage 102 through the rotation of the throttle valve 110. The shaft 120 is inserted through the air passage 102 in a radial direction. One end portion of the shaft 120 is rotatably supported by the throttle body 100, and the other end portion of the shaft 120 is connected to the gear train 150.

The electric motor 200 is installed in a motor chamber 202 formed in the throttle body 100 and generates the torque when the electric power is supplied to the electric motor 200. A supply path of the electric power to the electric motor 200 will be described later. The torque of the electric motor 200 is amplified by the gear train 150 and is transmitted to the shaft 120. As described above, the electric motor 200 supplies a drive force for rotating the throttle valve 110.

The gear train 150 includes a drive gear 160, a valve gear 130 and an intermediate gear 140. The drive gear 160 is installed to a rotatable shaft 204 of the electric motor 200 and is rotated together with the rotatable shaft 204. The valve gear 130 is installed to the end of the shaft 120 and is rotated together with the shaft 120. The intermediate gear 140 transmits the rotation of the drive gear 160 to the valve gear 130.

The valve opening degree sensor 300 senses the opening degree of the air passage 102 (hereinafter, referred to as the valve opening degree). In the present embodiment, the valve opening degree, which is sensed by the valve opening degree sensor 300, is sensed as a position (a rotational position) of the throttle valve 110. In the present embodiment, the valve opening degree sensor 300 is a contactless position sensor that uses a Hall IC (Integrated Circuit). The valve opening degree sensor 300 senses a rotational position of a permanent magnet (not shown) installed at an inner periphery of the valve gear 130 and outputs an electric signal that is proportional to a magnitude of a magnetic field generated by the permanent magnet. Therefore, an output of the Hall IC changes linearly in response to a change in the valve opening degree.

Figure 2:
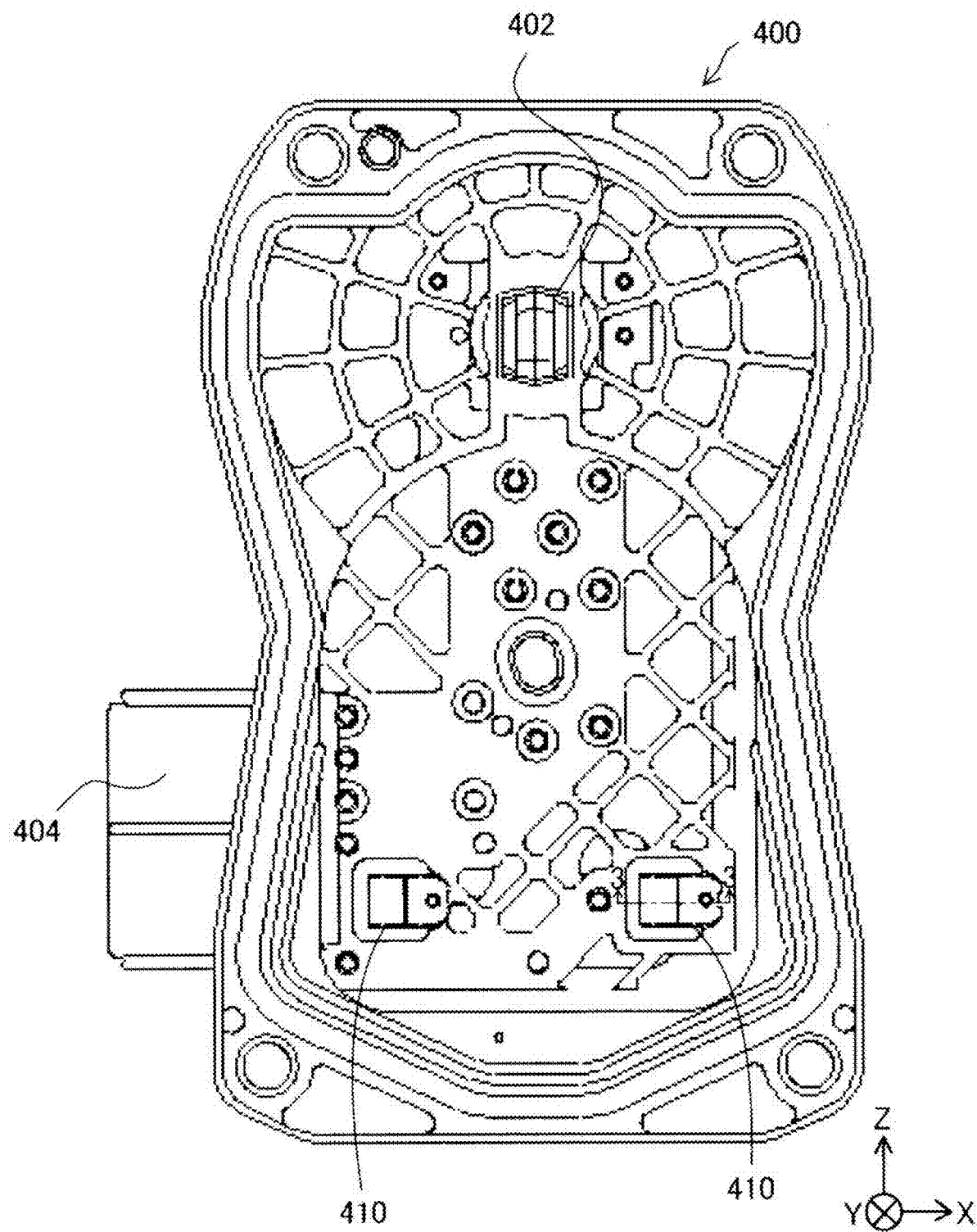
FIG. 2 is a front view of the throttle cover according to a first embodiment.

As shown in FIGS. 1 and 2, the throttle cover 400 is shaped in a form of a tray and has a meshed part. The throttle cover 400 is installed to an end surface of the throttle body 100 which faces in a +Y direction (a positive Y direction). The throttle cover 400 covers the throttle body 100, the gear train 150 and a plurality of motor terminals 206 of the electric motor 200 described later. In the present embodiment, the throttle cover 400 is made of resin. As shown in FIG. 2, the throttle cover 400 includes a sensor receiving portion 402, a connector portion 404 and two cover devices 410.

The sensor receiving portion 402 is a sensor cover portion that receives and supports the valve opening degree sensor 300. As shown in FIG. 1, the sensor receiving portion 402 is placed on a side of the shaft 120 in the +Y direction. The sensor receiving portion 402 supports the valve opening degree sensor 300 such that an end portion of the valve opening degree sensor 300 directed in a −Y direction (a negative Y direction), is positioned at an inside of the valve gear 130.

The connector portion 404 includes an interface for electrically connecting with an external power source (an external device), more specifically, an interface for installing an electric power cable extending from a battery installed on the vehicle. The connector portion 404 is placed at an end portion of the throttle cover 400, which faces a −Z direction (a negative Z direction), a −X direction (a negative X direction) and the +Y direction. The connector portion 404 and the sensor receiving portion 402 are electrically connected to each other by wiring (not shown). Furthermore, the connector portion 404 and each of the cover devices 410 is electrically connected with each other through a corresponding conductive member 420 described later. The conductive member 420 is in contact with a terminal member 10. When each of the motor terminals 206 come into pressure contact with the corresponding one of the terminal members 10, the electric power is supplied to the electric motor 200 through the motor terminals 206.

Figure 3:
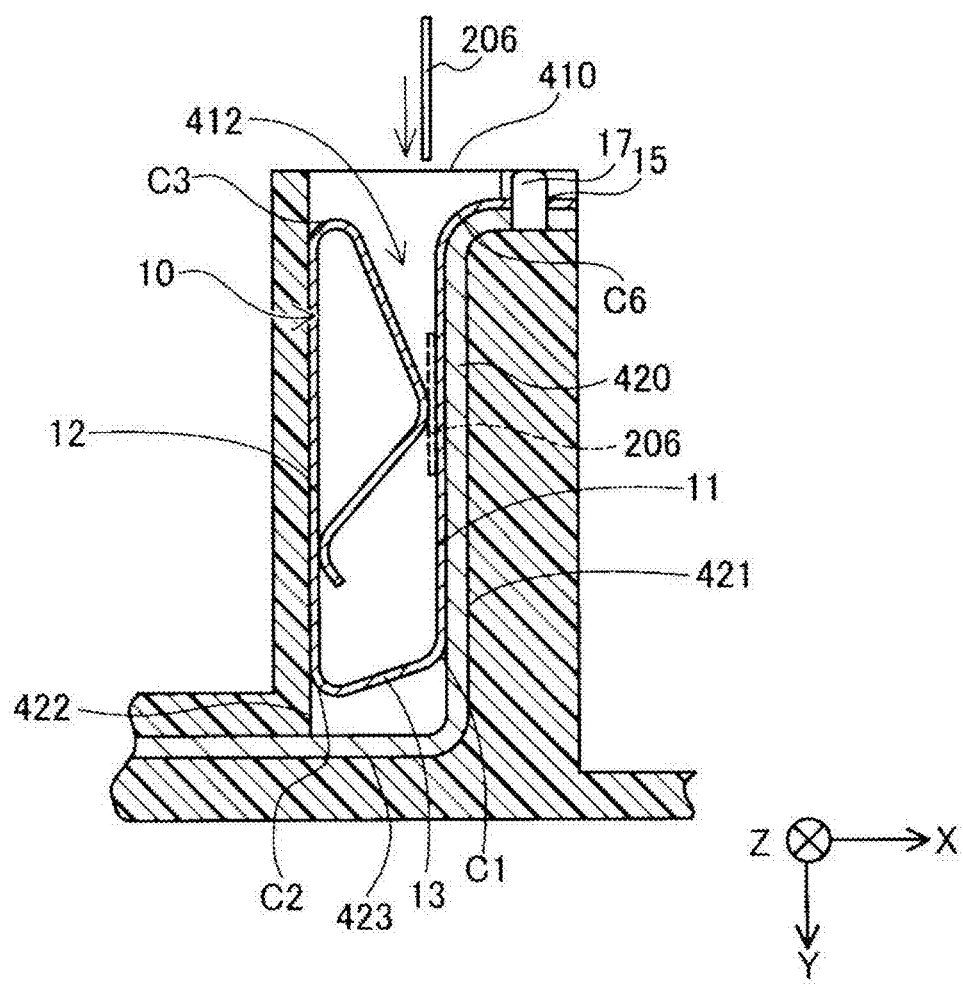
FIG. 3 is a cross-sectional view of the cover device according to the first embodiment.

As shown in FIG. 2, the two cover devices 410 are placed at a location spaced from the valve opening degree sensor 300 and are spaced from each other in an axial direction of the X axis. Each of the cover devices 410 are formed to project toward the throttle body 100. The cover device 410 covers the motor terminal 206 shown in FIG. 3 and electrically connects the motor terminal 206 to the external device. Like the rotatable shaft 204, the motor terminal 206 projects from the motor main body in the +Y direction. When the throttle cover 400 is installed to the throttle body 100, the motor terminals 206 are respectively inserted into the cover devices 410, as shown in FIG. 3. In the present embodiment, a direction of inserting the motor terminal 206 into the cover device 410, i.e., a direction being parallel to the +Y direction shown in FIG. 3 will be referred to as an inserting direction.

Each cover device 410 includes a terminal receiving portion 412, the conductive member 420 and the terminal member 10.

The terminal receiving portion 412 is in a form of recess that has a box shape and includes a plurality of inner peripheral surfaces. When the throttle cover 400 is installed to the throttle body 100, the motor terminal 206 is inserted into the terminal receiving portion 412. The terminal receiving portion 412 receives the terminal member 10 and a portion of the conductive member 420. In the present embodiment, the terminal receiving portion 412 is formed by resin. The terminal receiving portion 412 includes a first inner peripheral surface 421, a second inner peripheral surface 422 and a bottom surface 423. Among the inner peripheral surfaces of the terminal receiving portion 412, the first inner peripheral surface 421 serves as an end surface of the terminal receiving portion 412 in a +X direction (a positive X direction). Among the inner peripheral surfaces of the terminal receiving portion 412, the second inner peripheral surface 422 is a surface opposed to the first inner peripheral surface 421 and serves as an end surface of the terminal receiving portion 412 in the −X direction. Among the inner peripheral surfaces of the terminal receiving portion 412, the bottom surface 423 serves as an end surface of the terminal receiving portion 412 in the +Y direction.

The conductive member 420 is electrically conductively connected to the terminal member 10. Specifically, the conductive member 420 and the terminal member 10 are crimped together and are thereby coupled together. The conductive member 420 is structured such that a thin metal plate is bent in conformity with the inner peripheral surfaces of the terminal receiving portion 412. One end portion of the conductive member 420 is located adjacent to an opening of the terminal receiving portion 412, which is an end of the terminal receiving portion 412 in the −Y direction, and the end portion of the conductive member 420 is engaged with a projecting boss portion 17 described later. The other end portion of the conductive member 420 is located at the connector portion 404 (not shown in FIG. 3) and is electrically connected to the connector portion 404. The portion of the conductive member 420 is arranged along the first inner peripheral surface 421 and the bottom surface 423. In other words, the portion of the conductive member 420 is exposed at the first inner peripheral surface 421 and the bottom surface 423. The conductive member 420 conducts the electric power, which is supplied from the connector portion 404, to the motor terminal 206 through the terminal member 10.

Figure 4:
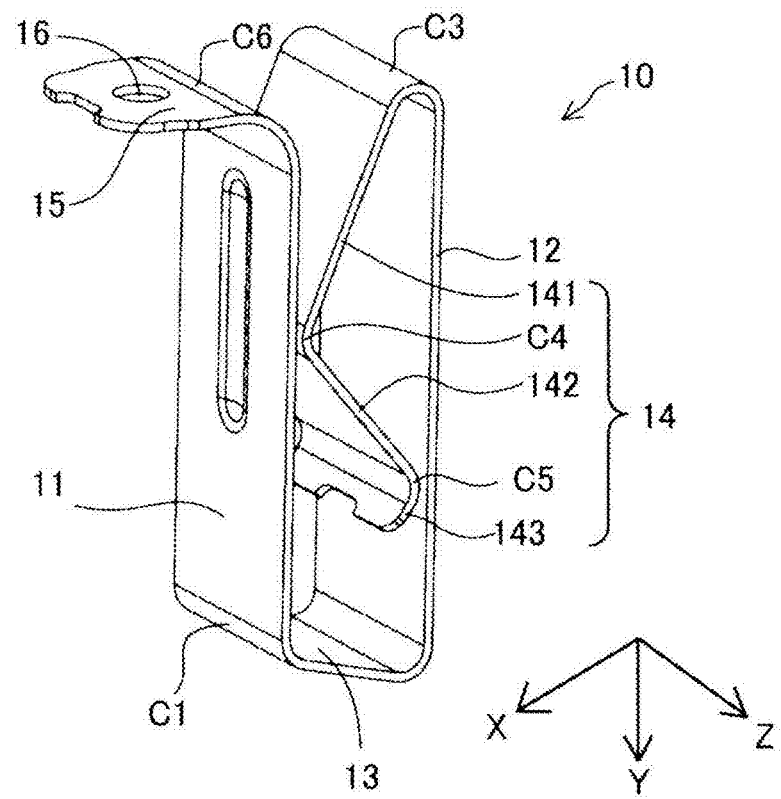
FIG. 4 is a perspective view of a terminal member according to the first embodiment.

The terminal member 10 is formed by a bent metal plate having flexibility and contacts the conductive member 420. Furthermore, the terminal member 10 is configured to be in pressure contact with the motor terminal 206 inserted into the terminal receiving portion 412. As shown in FIGS. 3 and 4, the terminal member 10 includes a first wall 11, a second wall 12, a third wall 13, a pressure-contact portion 14 and an upper surface portion 15.

As shown in FIG. 3, the first wall 11 is arranged along the first inner peripheral surface 421. Therefore, the first wall 11 has a surface that is parallel to a Y-Z plane. An end portion of the first wall 11, which is directed in the inserting direction, and an end portion of the third wall 13, which is directed in the +X direction, are joined with each other at a first connection C1. As shown in FIGS. 3 and 4, an end portion of the first wall 11, which is directed in an opposite direction (i.e., −Y direction) being opposite to the inserting direction (i.e., the +Y direction), and an end portion of the upper surface portion 15, which is directed in the −X direction, are joined with each other at a sixth connection C6.

The second wall 12 is arranged along the second inner peripheral surface 422. Therefore, like the first wall 11, the second wall 12 has a surface that is parallel to the Y-Z plane. An end portion of the second wall 12, which is directed in the inserting direction, and an end portion of the third wall 13, which is directed in the −X direction, are joined with each other at a second connection C2. An end portion of the second wall 12, which is directed in the opposite direction (i.e., −Y direction) being opposite to the inserting direction, and an end portion of the pressure-contact portion 14, which is directed in the −Y direction, are joined with each other at a third connection C3.

As described above, the two opposite end portions of the third wall 13, which are opposite to each other in the axial direction of the X axis, are joined to the first wall 11 and the second wall 12, respectively. The third wall 13 is opposed to the opening of the terminal receiving portion 412 and the bottom surface 423 (more accurately, the conductive member 420 arranged on the bottom surface 423). However, the third wall 13 is not parallel to the bottom surface 423 of the terminal receiving portion 412, which is parallel to the X-Z plane. That is, the third wall 13 is tilted relative to the bottom surface 423. Therefore, as shown in FIG. 3, the first connection C1 and the second connection C2 are respectively located at different locations in the axial direction of the Y axis. Specifically, the first connection C1 is located on a side of the second connection C2 in the −Y direction. Because of the above-described structure, an angle, which is defined between the first wall 11 and the third wall 13 at the first connection C1, is an obtuse angle (i.e., larger than 90 degrees). In contrast, an angle, which is defined between the second wall 12 and the third wall 13 at the second connection C2, is an acute angle (i.e., smaller than 90 degrees). In the present embodiment, the expression of "the angle defined between the one wall and the other wall" refers to the angle between an imaginary plane of an inner surface of the one wall and an imaginary plane of an inner surface of the other wall. For example, the angle defined between the first wall 11 and the third wall 13 refers to the angle between the plane of the surface of the first wall 11, which is parallel to the Y-Z plane and is opposed to the second wall 12, and the plane of the surface of the third wall 13, which faces in the −Y direction. The first, second and sixth connections C1, C2, C6, which are described above, and third to fifth connections C3, C4, C5, which will be described later, may be said to be bent portions which are formed at the time of bending the one metal plate to form the terminal member 10.

As shown in FIG. 4, the pressure-contact portion 14 includes a first sloped portion 141, the fourth connection C4, a second sloped portion 142, the fifth connection C5 and a third sloped portion 143. The first sloped portion 141 has a sloped surface that extends in the +Y direction and the +X direction. An end portion of the first sloped portion 141, which is directed in the −Y direction and the −X direction, and an end portion of the second wall 12, which is directed in the −Y direction, are joined with each other at the third connection C3. Furthermore, an end portion of the first sloped portion 141, which is directed in the +Y direction and the +X direction, and the second sloped portion 142 are joined with each other at the fourth connection C4. An angle, which is defined between the second wall 12 and the first sloped portion 141 at the third connection C3, is an acute angle. Furthermore, an angle, which is defined between the first sloped portion 141 and the second sloped portion 142, is an obtuse angle. In a state where the motor terminal 206 is not inserted into the cover device 410, the fourth connection C4 contacts the first wall 11. The second sloped portion 142 has a sloped surface that extends in the +Y direction and the −X direction. An end portion of the second sloped portion 142, which is directed in the +Y direction and the −X direction, and an end portion of the third sloped portion 143, which is directed in the −Y direction and the −X direction, are joined with each other at the fifth connection C5. The third sloped portion 143 has a sloped surface that extends in the +Y direction and the +X direction. As described above, the end portion of the third sloped portion 143, which is directed in the −Y direction and the −X direction, is joined to the second sloped portion 142 at the fifth connection C5. In contrast, an end portion of the third sloped portion 143, which is directed in the +Y direction and the +X direction, is open ended. In the state where the motor terminal 206 is not inserted into the cover device 410, the fifth connection C5 contacts the second wall 12. As shown in FIGS. 3 and 4, a length of the third sloped portion 143 in the axial direction of the Y axis is shorter than a length of the first sloped portion 141 in the axial direction of the Y axis and a length of the second sloped portion 142 in the axial direction of the Y axis.

Because of the above-described structure, the pressure-contact portion 14 is shaped to be bent from the second wall 12 such that the pressure-contact portion 14 progressively approaches toward the first wall 11 away from the second wall 12 until a turning point (the fourth connection C4) and then progressively approaches back toward the second wall 12 away from the first wall 11 until another turning point (the fifth connection C5) and then progressively approaches back toward the first wall 11 away from the second wall 12 as the pressure-contact portion 14 extends in the inserting direction. The pressure-contact portion 14 made of the thin plate has a spring property because of the above-described shape of pressure-contact portion 14. Therefore, as shown in FIG. 3, when the motor terminal 206 is inserted into the cover device 410, the pressure-contact portion 14 moves in the −X direction and the +Y direction as a whole to enable the insertion of the motor terminal 206. At the same time, the pressure-contact portion 14 urges the motor terminal 206 against the first wall 11 in the +X direction. As a result, the motor terminal 206 and the first wall 11 (the terminal member 10) are physically in contact with each other and are electrically connected to each other. Since the first sloped portion 141 has the surface, which extends in the +Y direction and +X direction, the first sloped portion 141 has a function of guiding the inserted motor terminal 206 in the +X direction toward the contact between the fourth connection C4 and the first wall 11.

The upper surface portion 15 has a surface that is parallel to the X-Z plane and is arranged along a contour of an end portion of the terminal receiving portion 412 which is directed in the −Y direction and the +X direction, as shown in FIG. 3. As shown in FIG. 4, an end portion of the upper surface portion 15, which is directed in the −X direction, and an end portion of the first wall 11, which is directed in the −Y direction, are joined with each other at the sixth connection C6. An end portion of the upper surface portion 15, which is directed in the +X direction, is open ended. A boss hole 16 is formed at the center of the upper surface portion 15. A projecting boss portion 17 is inserted into the boss hole 16. The projecting boss portion 17 is placed at the end portion of the terminal receiving portion 412, which is directed in the −Y direction and the +X direction, such that the projecting boss portion 17 projects in the −Y direction. In the present embodiment, the boss hole 16 and the projecting boss portion 17 are engaged with each other by snap fit. By engaging the boss hole 16 and the projecting boss portion 17 together in this way, the terminal member 10 is placed in position, and the terminal member 10 is cantilevered by the terminal receiving portion 412. As shown in FIG. 3, like the upper surface portion 15, an end portion of the conductive member 420, which is directed in the −Y direction and the +X direction, is arranged along the contour of the end portion of the terminal receiving portion 412 which is directed in the −Y direction and the +X direction. Therefore, the upper surface portion 15 makes surface to surface contact with the conductive member 420. A boss hole is also formed at the conductive member 420 such that the boss hole of the conductive member 420 and the projecting boss portion 17 are engaged with each other. Therefore, by engaging the boss hole 16 of the terminal member 10 and the boss hole of the conductive member 420 with the projecting boss portion 17, the terminal member 10 and the conductive member 420 are crimped together.

As the electric motor 200 is driven, the motor terminal 206 may be vigorously vibrated in the inserting direction and the opposite direction thereof, i.e., in the axial direction of the Y axis. In such a high vibration environment, the terminal member 10, which clamps the motor terminal 206, may also be vigorously vibrated in the axial direction of the Y axis. However, due to the above-described structure of the terminal member 10, it is possible to suppress the terminal member 10 from vibrating in the axial direction of the Y axis, more accurately, in the −Y direction. This vibration suppression will be described with reference to FIG. 5.

A2. Vibration Suppression

Figure 5:
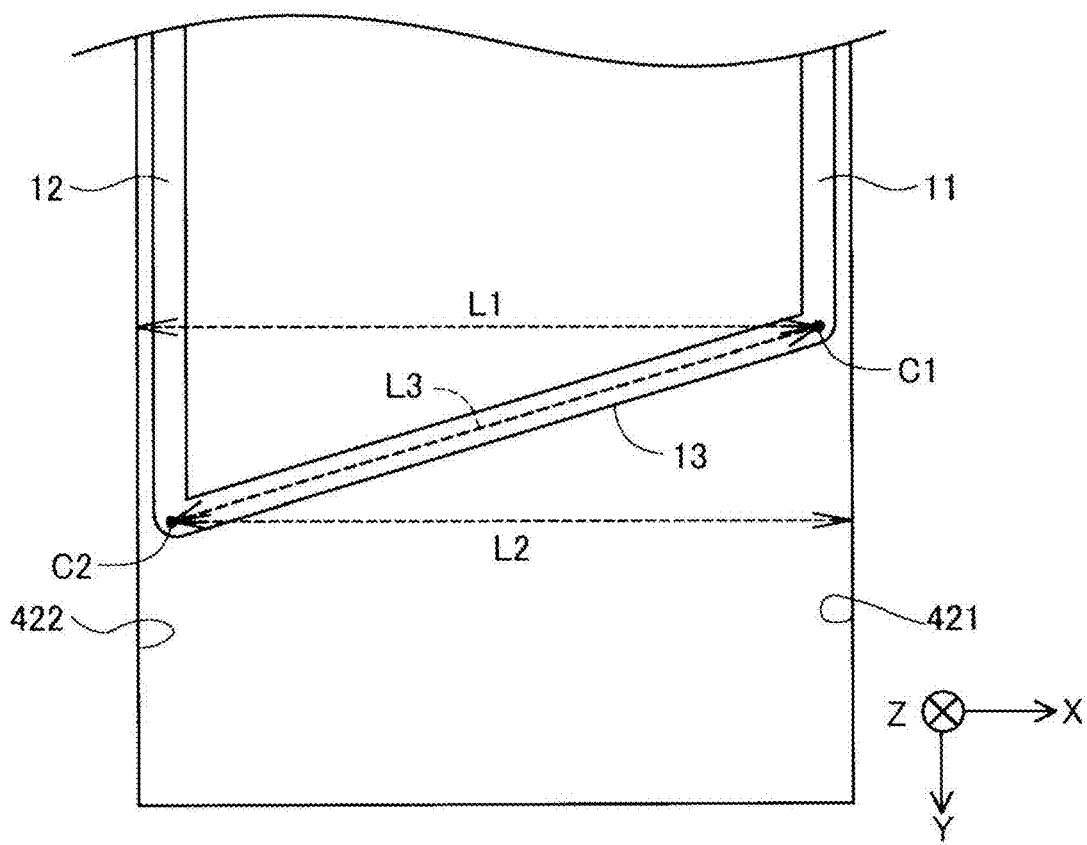
FIG. 5 is a cross-sectional view showing a detailed structure of the terminal member according to the first embodiment.

As shown in FIG. 5, a length L3 of the third wall 13, which is measured in a direction directed from the first connection C1 to the second connection C2, is longer than a distance L1 between the first connection C1 and the second inner peripheral surface 422. The distance L1 corresponds to a length of a perpendicular line, which is perpendicular to the second inner peripheral surface 422 and extends from the first connection C1 to the second inner peripheral surface 422. Furthermore, the length L3 is longer than a distance L2 between the second connection C2 and the first inner peripheral surface 421. The distance L2 corresponds to a length of a perpendicular line, which is perpendicular to the first inner peripheral surface 421 and extends from the second connection C2 to the first inner peripheral surface 421. As described above, the length L3 is set to be longer than the distance L1 and the distance L2 to provide the following effect. Specifically, at the time of vibrating the motor terminal 206 in the axial direction of the Y axis in response to the operation of the electric motor, when the third wall 13 is forced to swing upward about the first connection C1 by the vibration of the motor terminal 206, the third wall 13 (the second connection C2) abuts against the second inner peripheral surface 422, which is the vertical wall of the cover device 410. Therefore, the third wall 13 cannot make further movement in the −Y direction. Therefore, the vibration (the movement) of the terminal member 10 in the −Y direction is suppressed. The third wall 13 can swing about the first connection C1 in the +Y direction. However, since the movement of the third wall 13 in the −Y direction is limited, the vibration of the terminal member 10 is limited.

In contrast, as in the previously proposed technique, in the structure where the third wall of the terminal member is perpendicular to the first inner peripheral surface 421 and the second inner peripheral surface 422, when the third wall swings about the first connection in the up-to-down direction, the third wall cannot abut against the vertical wall of the cover device 410, which extends in the up-to-down direction. Therefore, the third wall swings in the up-to-down direction. On the other hand, in the cover device 410 of the present embodiment, at the time of generating the vibration caused by the operation of the electric motor, the third wall 13 abuts against the vertical wall of the cover device 410, and thereby the third wall 13 and the second wall 12 do not swing upward. Thus, the vibration of the terminal member 10 can be suppressed.

In the cover device 410 of the first embodiment described above, the length L3 of the third wall 13, which is measured in the direction directed from the first connection C1, which connects between the end portion of the first wall 11 and the end portion of the third wall 13, to the second connection C2, which connects between the end portion of the second wall 12 and the end portion of the third wall 13, is longer than the distance L1 between the first connection C1 and the second inner peripheral surface 422 and is longer than the distance L2 between the second connection C2 and the first inner peripheral surface 421. Therefore, when the motor terminal 206 vibrates in the inserting direction or the opposite direction opposite to the inserting direction, the second connection C2, which is the end portion of the third wall 13, abuts against the second inner peripheral surface 422, and thereby the vibration of the third wall 13 and the second wall 12 in the opposite direction (the −Y direction), which is opposite to the inserting direction, is suppressed. Thus, the vibration of the terminal member 10 can be suppressed, and the wear of the cover device 410 (e.g., the wear of the terminal member 10 and the wear of the conductive member 420 in contact with the terminal member 10) caused by the operation of the electric motor can be suppressed. In addition, in comparison to, for example, a structure where in order to suppress the vibration of the terminal member 10, the second wall 12 is engaged to the second inner peripheral surface 422 to support the terminal member 10 at the two sides, since the above-described structure of the present embodiment can be obtained by adjusting the bending angle of the first connection C1 and the bending angle of the second connection C2 at the terminal member 10, the manufacturing cost of the cover device 410 can be suppressed, and the ease of the assembling of the terminal member 10 into the terminal receiving portion 412 at the time of manufacturing the cover device 410 can be improved.

B1. Second Embodiment

Figure 6:
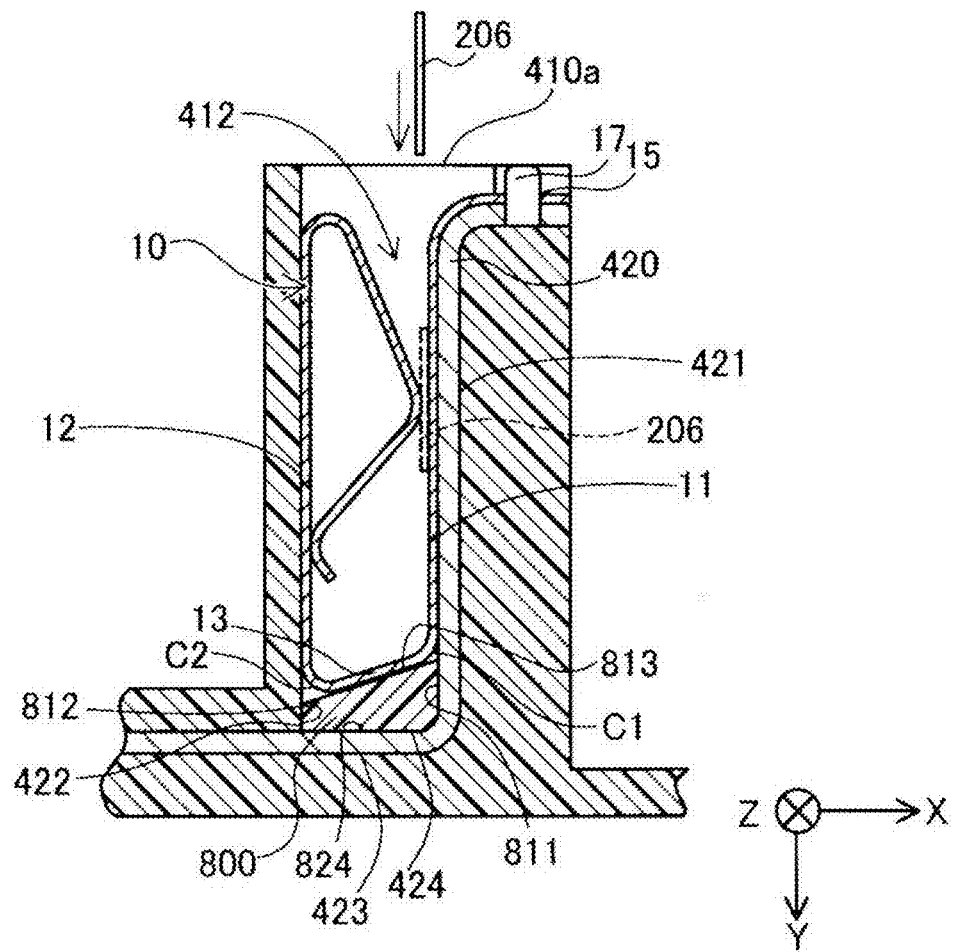
FIG. 6 is a cross-sectional view of a cover device according to a second embodiment.

A structure of a cover device 410*a* of a second embodiment differs from the cover device 410 of the first embodiment with respect to that a support member 800 is received in the terminal receiving portion 412, as shown in FIG. 6. The rest of the structure of the cover device 410*a* of the second embodiment is the same as that of the cover device 410 of the first embodiment. Therefore, the components, which are the same as those of the first embodiment, will be indicated by the same reference sings and will not be described redundantly for the sake of simplicity.

The support member 800 is made of resin and is arranged in contact with a bottom surface (an end surface in the +Y direction) of the third wall 13 of the terminal member 10, as shown in FIG. 6. The support member 800 supports the terminal member 10 and improves the posture of the terminal member 10 in the terminal receiving portion 412. The support member 800 includes a first surface portion 811, a second surface portion 812, a third surface portion 813 and a fourth surface portion 824.

The first surface portion 811 is arranged along the first inner peripheral surface 421. Therefore, the first surface portion 811 has a surface that is parallel to the Y-Z plane. The second surface portion 812 is arranged along the second inner peripheral surface 422. Therefore, the second surface portion 812 has a surface that is parallel to the Y-Z plane.

The third surface portion 813 corresponds to an end surface of the support member 800 directed in the −Y direction and is arranged along the third wall 13 of the terminal member 10. The third surface portion 813 is a support surface which is parallel to the third wall 13, and the third surface portion 813 contacts the third wall 13 and supports the terminal member 10. Two opposite end portions of the third surface portion 813, which are opposite to each other in the axial direction of the X axis, are connected to the first surface portion 811 and the second surface portion 812, respectively. Like the third wall 13, the third surface portion 813 is not parallel to the bottom surface 423 of the terminal receiving portion 412, which is parallel to the X-Z plane, that is, the third surface portion 813 is tilted relative to the bottom surface 423.

The fourth surface portion 824 is arranged along an upper surface 424 of the conductive member 420 which is arranged along the bottom surface 423 of the terminal receiving portion 412. The fourth surface portion 824 has a surface that is parallel to the X-Z plane. Two opposite end portions of the fourth surface portion 824, which are opposite to each other in the axial direction of the X axis, are connected to the first surface portion 811 and the second surface portion 812, respectively. Unlike the third surface portion 813 described above, the fourth surface portion 824 is parallel to the bottom surface 423 of the terminal receiving portion 412.

Figure 7:
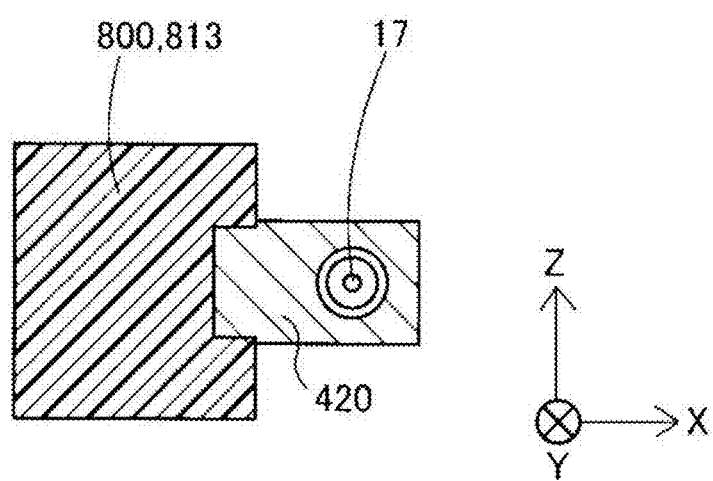
FIG. 7 is an explanatory diagram showing an arrangement of a conductive member and a support member according to the second embodiment.

Now, the description will be made with reference to FIG. 7. FIG. 7 shows the conductive member 420, the support member 800 and the projecting boss portion 17 when the cover device 410*a* of the second embodiment is viewed in the +Y direction. In FIG. 7, the terminal member 10 is not depicted for the sake of clarity. Furthermore, in each of FIGS. 8-10, 12-14, 16-18, 20-21, 23-26, the terminal member 10 is also not depicted for the sake of clarity. As shown in FIG. 7, the support member 800 installed in the cover device 410*a* of the second embodiment substantially entirely covers the portion of the conductive member 420, which is placed in the terminal receiving portion 412, in the view taken in the +Y direction. An end surface of the third wall 13, which is directed in the +Y direction, entirely contacts the third surface portion 813. In other words, the support member 800 has a support surface which is parallel to the third wall 13 of the terminal member 10, and the support member 800 contacts the third wall 13 through the support surface and supports the terminal member 10. The cover device 410*a* of the second embodiment improves the stability of the posture of the terminal member 10 and suppresses the terminal member 10 from swinging in the +Y direction toward the support member 800 side.

The cover device 410*a* of the second embodiment described above can achieve the advantages which are similar to those of the cover device 410 of the first embodiment. In addition, the cover device 410*a* of the second embodiment includes the support member 800 that has the support surface which is parallel to the third wall 13 of the terminal member 10, and the support member 800 supports the third wall 13 through the support surface thereof. Therefore, the swing of the terminal member 10 toward the lower side, i.e., the support member 800 side is suppressed. Thus, the wear of the components of the cover device 410*a* (e.g., the wear of the terminal member 10 and the wear of the conductive member 420 in contact with the terminal member 10) caused by the operation of the electric motor can be suppressed.

B2. Other Embodiments of Second Embodiment

In the second embodiment, the support member 800 is arranged on substantially the entire surface of the conductive member 420 that is arranged along the bottom surface 423 of the terminal receiving portion 412 when viewed in the +Y direction. However, the present disclosure is not limited this arrangement.

B2-1. (Another Embodiment 1)

Figure 8:
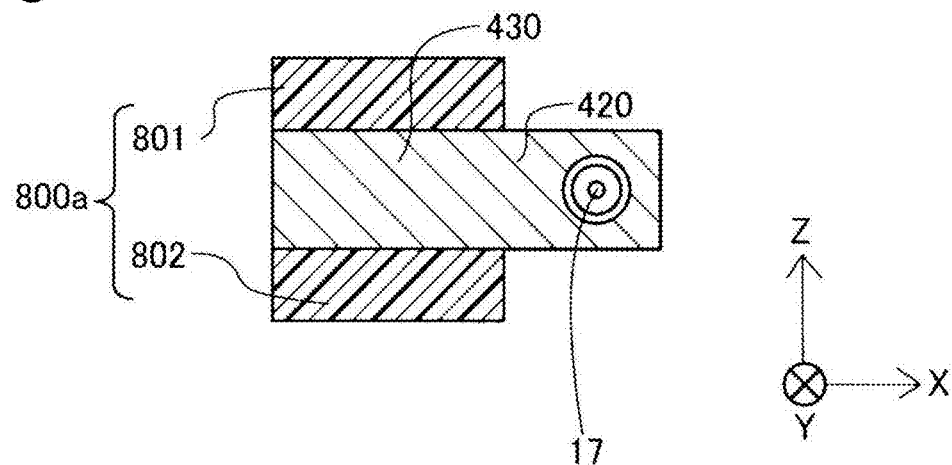
FIG. 8 is an explanatory diagram of another embodiment 1 of the second embodiment.

For example, as shown in FIG. 8, in another embodiment 1 of the second embodiment, the conductive member 420 includes a bottom-surface exposed portion 430 that is shaped in a strip form and is exposed to the terminal receiving portion 412. A support member 800a of the other embodiment 1 includes a first sub-support portion 801 and a second sub-support portion 802 which serve as a pair of sub-support portions and are respectively placed on one side and another side of the bottom-surface exposed portion 430 at the bottom surface 423. In a plan view, each of the sub-support portions 801, 802 is in a form of an elongated rectangle, which is elongated in the axial direction of the X axis. The first sub-support portion 801 is placed adjacent to the bottom-surface exposed portion 430 on one side of the bottom-surface exposed portion 430 in the +Z direction. The second sub-support portion 802 is placed adjacent to the bottom-surface exposed portion 430 on the other side of the bottom-surface exposed portion 430 in the −Z-axis direction. By adjacently placing the support member 800a on both sides of the bottom-surface exposed portion 430 in the axial direction of the Z axis, it is possible to reduce the amount of resin of the support member 800a in comparison to the structure where the support member is arranged on substantially the entire surface of the conductive member 420 in the terminal receiving portion 412. Therefore, the swing of the terminal member 10 in the +Y direction toward the lower side can be suppressed with the simple structure, and the wear of the components of the cover device 410a caused by the operation of the electric motor can be suppressed.

B2-2. (Another Embodiment 2)

Figure 9:
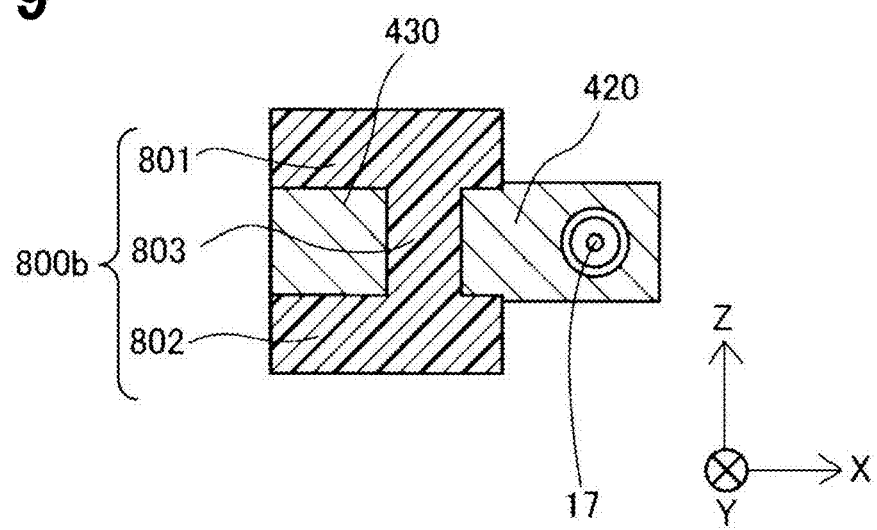
FIG. 9 is an explanatory diagram of another embodiment 2 of the second embodiment.

As shown in FIG. 9, a support member 800b of another embodiment 2 of the second embodiment is different from the support member 800a of the other embodiment 1 shown in FIG. 8 only in that the support member 800b includes a connecting portion 803. The connecting portion 803 connects between the first sub-support portion 801 and the second sub-support portion 802 in the axial direction of the Z axis. The connecting portion 803 is located on a side of the bottom-surface exposed portion 430 in the −Y direction. In the present embodiment, the connecting portion 803 is displaced in the +X direction from a center of each of the first and second sub-support portions 801, 802 that is centered in the axial direction of the X axis. Even with this structure, the advantages, which are similar to those of the support member 800a of the other embodiment 1, can be achieved. In addition, by providing the connecting portion 803, it is possible to limit the first sub-support portion 801 and the second sub-support portion 802 from being displaced from each other at the time of generating the vibration. Furthermore, since the connecting portion 803 is located on the side of the bottom-surface exposed portion 430 in the −Y direction, it is possible to limit the conductive member 420 from being displaced in the −Y direction at the time of generating the vibration.

B2-3. (Another Embodiment 3)

Figure 10:
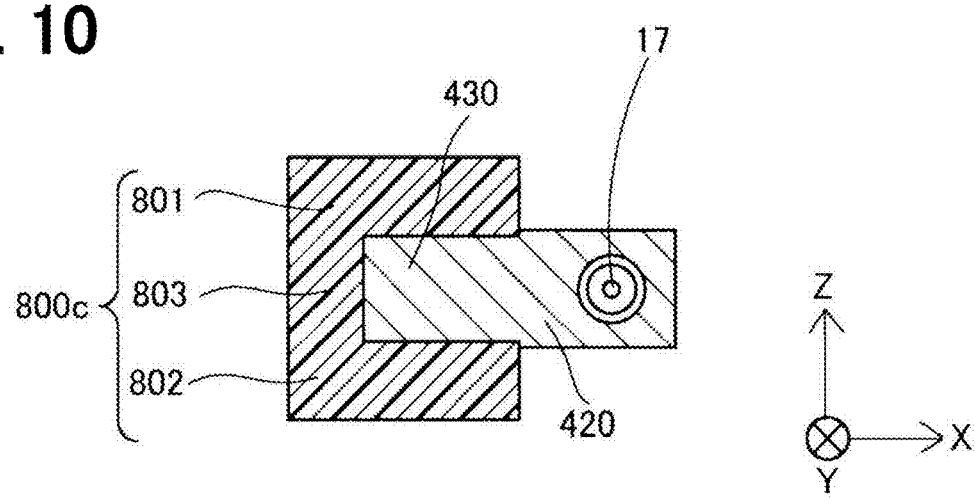
FIG. 10 is an explanatory diagram of another embodiment 3 of the second embodiment.

As shown in FIG. 10, a support member 800c of another embodiment 3 of the second embodiment is different from the support member 800b of the other embodiment 2 only with respect to the position of the connecting portion 803. In the support member 800c, the connecting portion 803 is located at an end portion of the first sub-support portion 801 and an end portion of the second sub-support portion 802, which are directed in the −X direction. Even with this structure, the advantages, which are similar to those of the support member 800b of the other embodiment 2, can be achieved. As can be understood from the other embodiments 2 and 3, the connecting portion 803 may be provided at any position along the first sub-support portion 801 and the second sub-support portion 802 in the axial direction of the X axis.

B2-4. (Another Embodiment 4)

Figure 11:
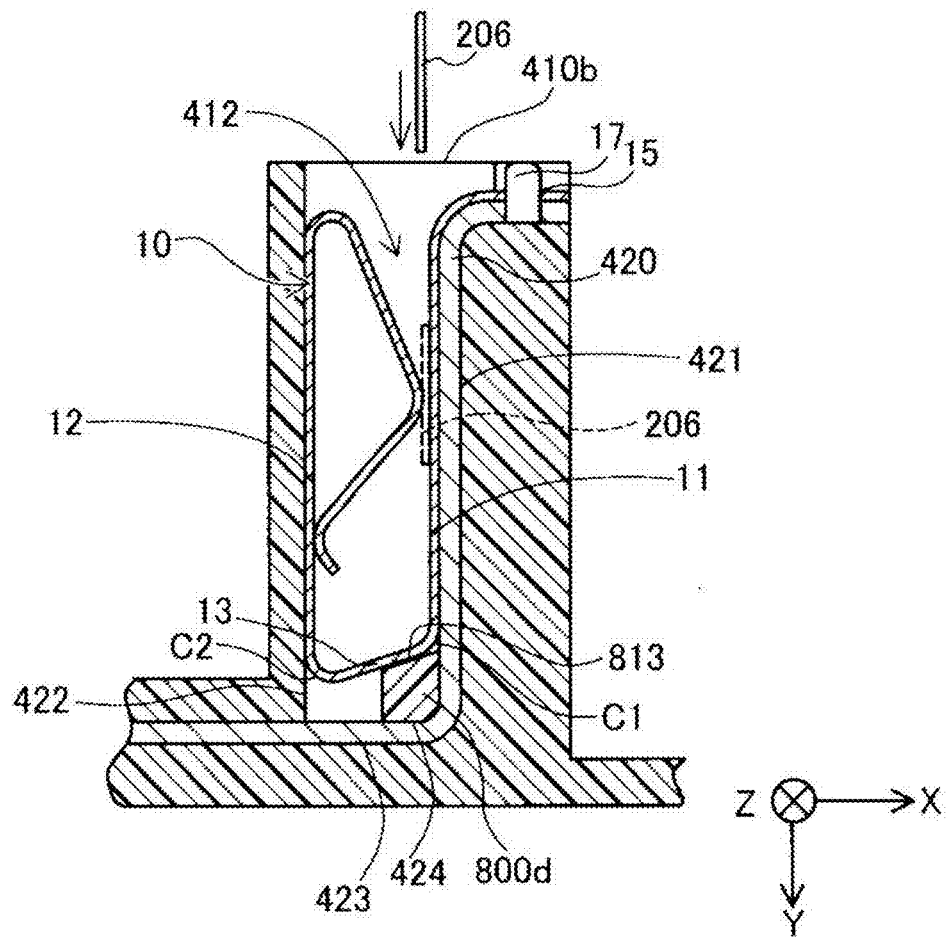
FIG. 11 is a cross-sectional view of a cover device according to another embodiment 4 of the second embodiment.
Figure 12:
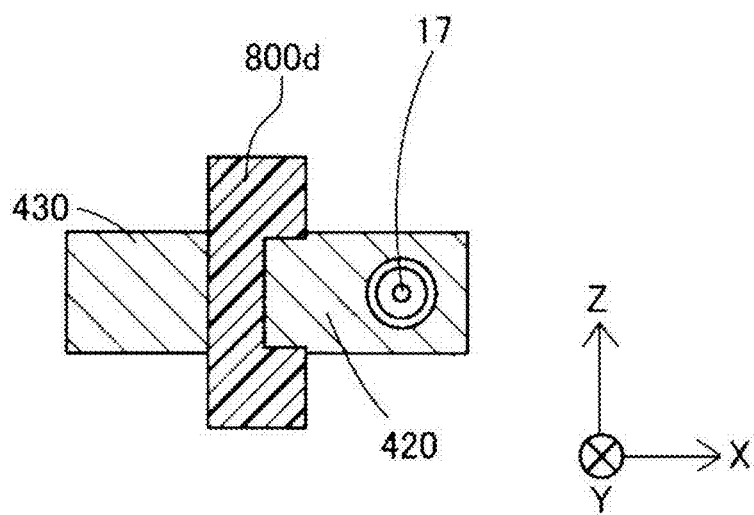
FIG. 12 is an explanatory diagram of another embodiment 4 of the second embodiment.

A cover device 410b of another embodiment 4 of the second embodiment shown in FIGS. 11 and 12 differs from the cover device 410a of the second embodiment with respect to that the cover device 410b includes a support member 800d in place of the support member 800. The support member 800d of the other embodiment 4 has a shape that is formed by cutting approximately one half of the support member 800 of the second embodiment which faces in the −X direction. The cover device 410b of the other embodiment 4 of the second embodiment having the above-described structure can achieve the advantages which are similar to those of the cover devices 410, 410a of the first and second embodiments. In addition, in comparison to the second embodiment, the amount of resin of the support member can be reduced to suppress the manufacturing cost of the cover device 410b.

B2-5. (Another Embodiment 5)

Figure 13:
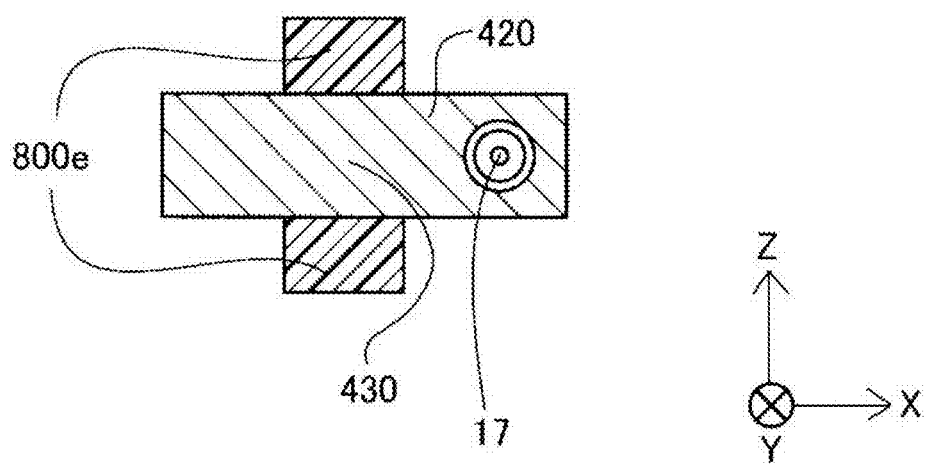
FIG. 13 is an explanatory diagram of another embodiment 5 of the second embodiment.

A support member 800e of another embodiment 5 of the second embodiment shown in FIG. 13 has a shape that is formed by cutting approximately one half of the support member 800a of the other embodiment 1 which faces in the −X direction. The cover device of the other embodiment 5 of the second embodiment having the above-described structure can achieve the advantages which are similar to those of the cover devices 410, 410a of the first and second embodiments and the cover device of the other embodiment 1 of the second embodiment.

B2-6. (Another Embodiment 6)

Figure 14:
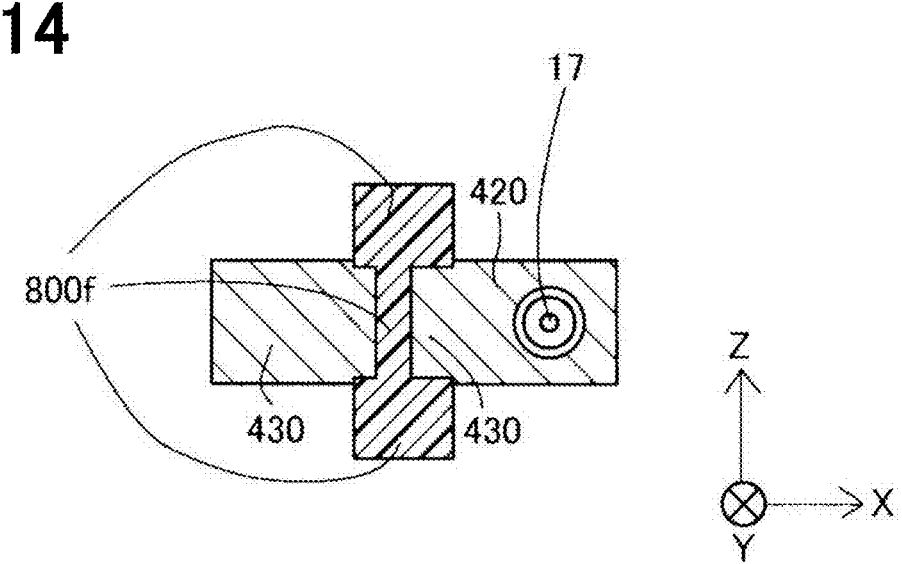
FIG. 14 is an explanatory diagram of another embodiment 6 of the second embodiment.

A support member 800f of another embodiment 6 of the second embodiment shown in FIG. 14 has a shape that is formed by cutting approximately one half of the support member 800b of the other embodiment 2 which faces in the −X direction. The cover device of the other embodiment 6 of the second embodiment having the above-described structure can achieve the advantages which are similar to those of the cover devices 410, 410a of the first and second embodiments and the cover device of the other embodiment 2 of the second embodiment.

B2-7. (Another Embodiment 7)

Figure 15:
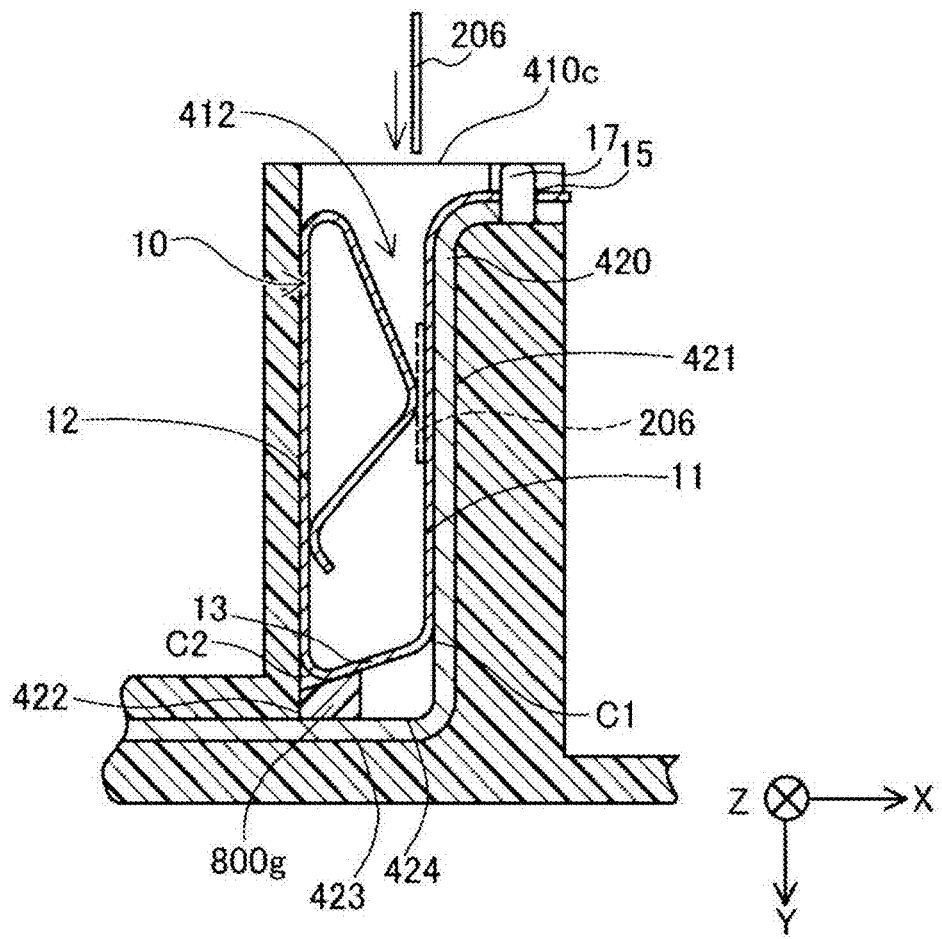
FIG. 15 is a cross-sectional view of a cover device according to another embodiment 7 of the second embodiment.
Figure 16:
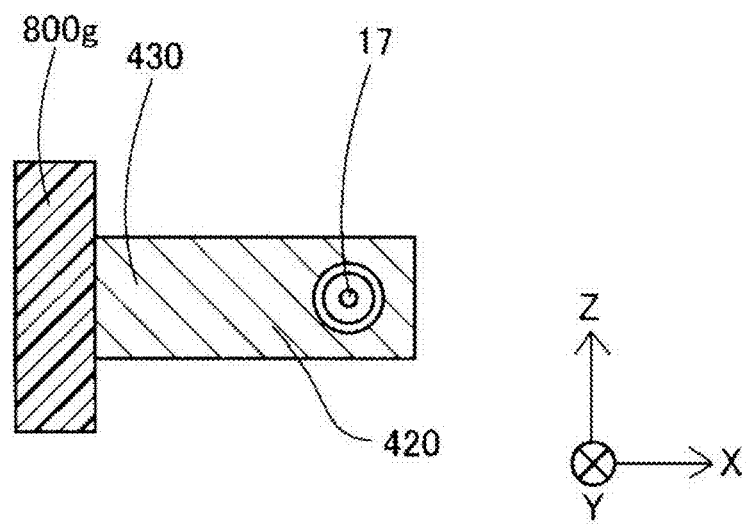
FIG. 16 is an explanatory diagram of another embodiment 7 of the second embodiment.

A cover device 410c of another embodiment 7 of the second embodiment shown in FIGS. 15 and 16 differs from the cover device 410a of the second embodiment with respect to that the cover device 410c includes a support member 800g in place of the support member 800. The support member 800g of the other embodiment 7 has a shape that is formed by cutting approximately one half of the support member 800 of the second embodiment which faces in the +X direction. The cover device 410*c* of the other embodiment 7 of the second embodiment having the above-described structure can achieve the advantages which are similar to those of the cover devices 410, 410*a* of the first and second embodiments. In addition, in comparison to the second embodiment, the amount of resin of the support member can be reduced to suppress the manufacturing cost of the cover device 410*c*.

B2-8. (Another Embodiment 8)

Figure 17:
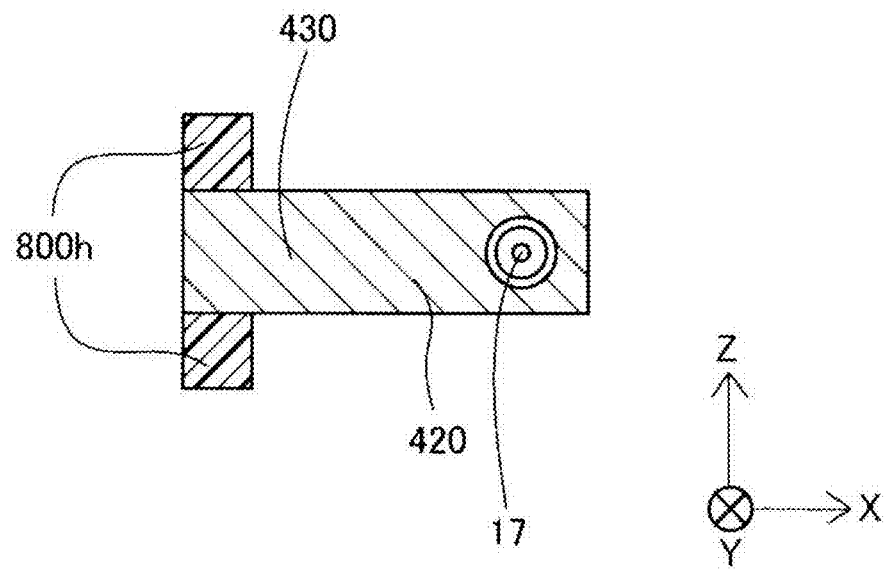
FIG. 17 is an explanatory diagram of another embodiment 8 of the second embodiment.

A support member 800*h* of another embodiment 8 of the second embodiment shown in FIG. 17 has a shape that is formed by cutting approximately one half of the support member 800*a* of the other embodiment 1 which faces in the +X direction. The cover device of the other embodiment 8 of the second embodiment having the above-described structure can achieve the advantages which are similar to those of the cover devices 410, 410*a* of the first and second embodiments and the cover device of the other embodiment 1 of the second embodiment.

B2-9. (Another Embodiment 9)

Figure 18:
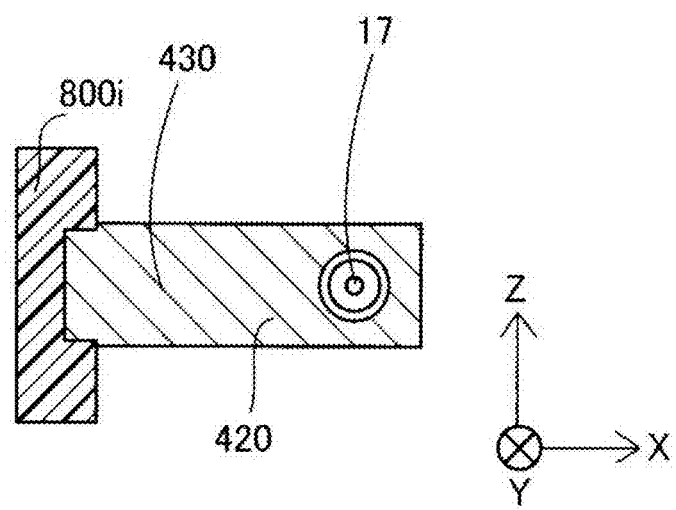
FIG. 18 is an explanatory diagram of another embodiment 9 of the second embodiment.

A support member 800*i* of another embodiment 9 of the second embodiment shown in FIG. 18 has a shape that is formed by cutting approximately one half of the support member 800*c* of the other embodiment 3 which faces in the +X direction. The cover device of the other embodiment 9 of the second embodiment having the above-described structure can achieve the advantages which are similar to those of the cover devices 410, 410*a* of the first and second embodiments and the cover device of the other embodiment 3 of the second embodiment.

B2-10. (Another Embodiment 10)

Figure 19:
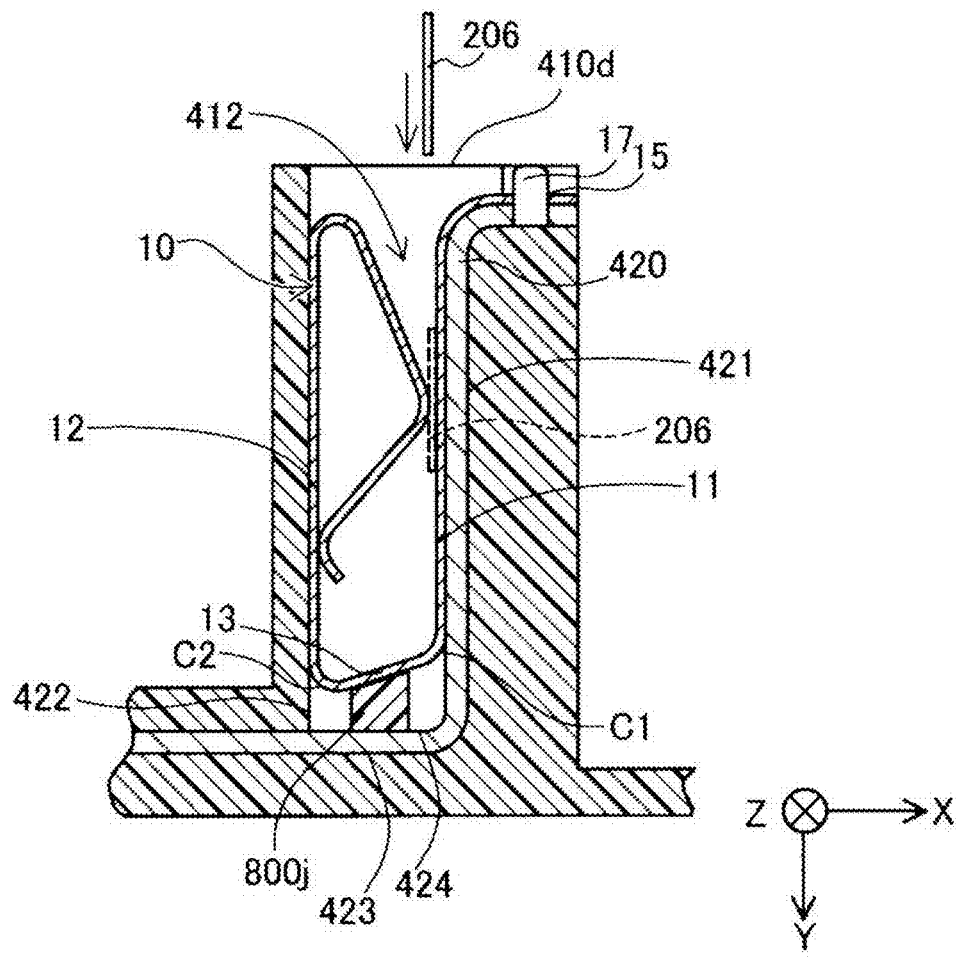
FIG. 19 is a cross-sectional view of a cover device according to another embodiment 10 of the second embodiment.
Figure 20:
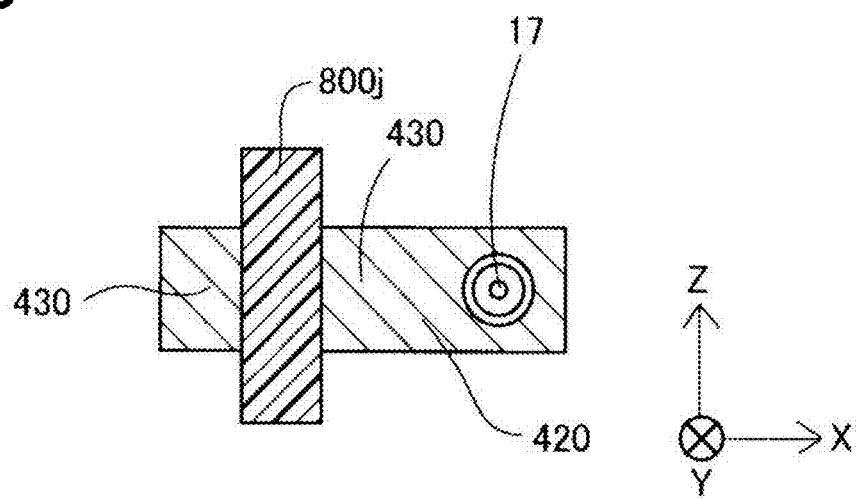
FIG. 20 is an explanatory diagram of another embodiment 10 of the second embodiment.

A cover device 410*d* of another embodiment 10 of the second embodiment shown in FIGS. 19 and 20 differs from the cover device 410*a* of the second embodiment with respect to that the cover device 410*d* includes a support member 800*j* in place of the support member 800. The support member 800*j* of the other embodiment 10 has a shape that is formed by cutting approximately one third of the support member 800 of the second embodiment which faces in the −X direction and also cutting approximately one third of the support member 800 which faces in the +X direction. In other words, the support member 800*d* of the other embodiment 10 has the shape that corresponds to one third of the support member 800 which is located at the center of the support member 800 in the axial direction of the X axis. The cover device 410*d* of the other embodiment 10 of the second embodiment having the above-described structure can achieve the advantages which are similar to those of the cover devices 410, 410*a* of the first and second embodiments. In addition, in comparison to the second embodiment, the amount of resin of the support member can be reduced to suppress the manufacturing cost of the cover device 410*d*.

B2-11. (Another Embodiment 11)

Figure 21:
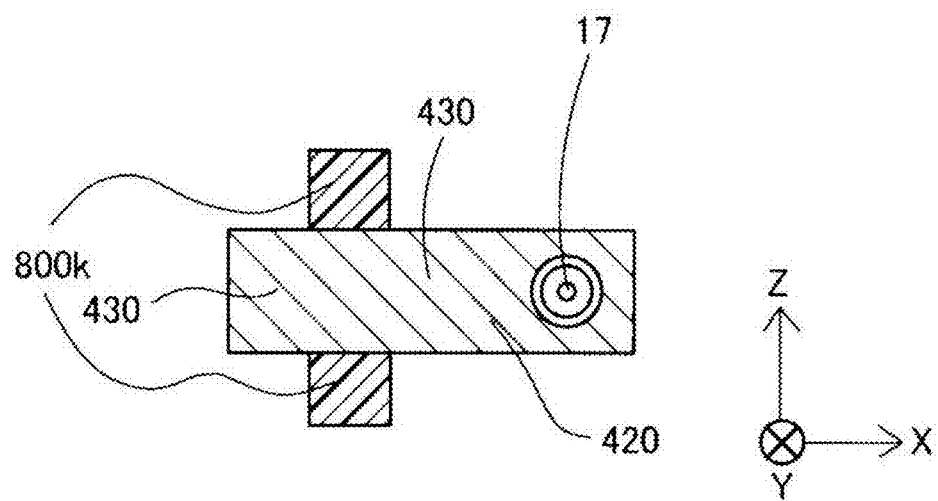
FIG. 21 is an explanatory diagram of another embodiment 11 of the second embodiment.

A support member 800*k* of another embodiment 11 of the second embodiment shown in FIG. 21 has a shape that is formed by cutting approximately one third of the support member 800*a* of the other embodiment 1 which faces in the −X direction and also cutting approximately one third of the support member 800*a* which faces in the +X direction. The cover device of the other embodiment 11 of the second embodiment having the above-described structure can achieve the advantages which are similar to those of the cover devices 410, 410*a* of the first and second embodiments and the cover device of the other embodiment 1 of the second embodiment.

B2-12. (Another Embodiment 12)

Figure 22:
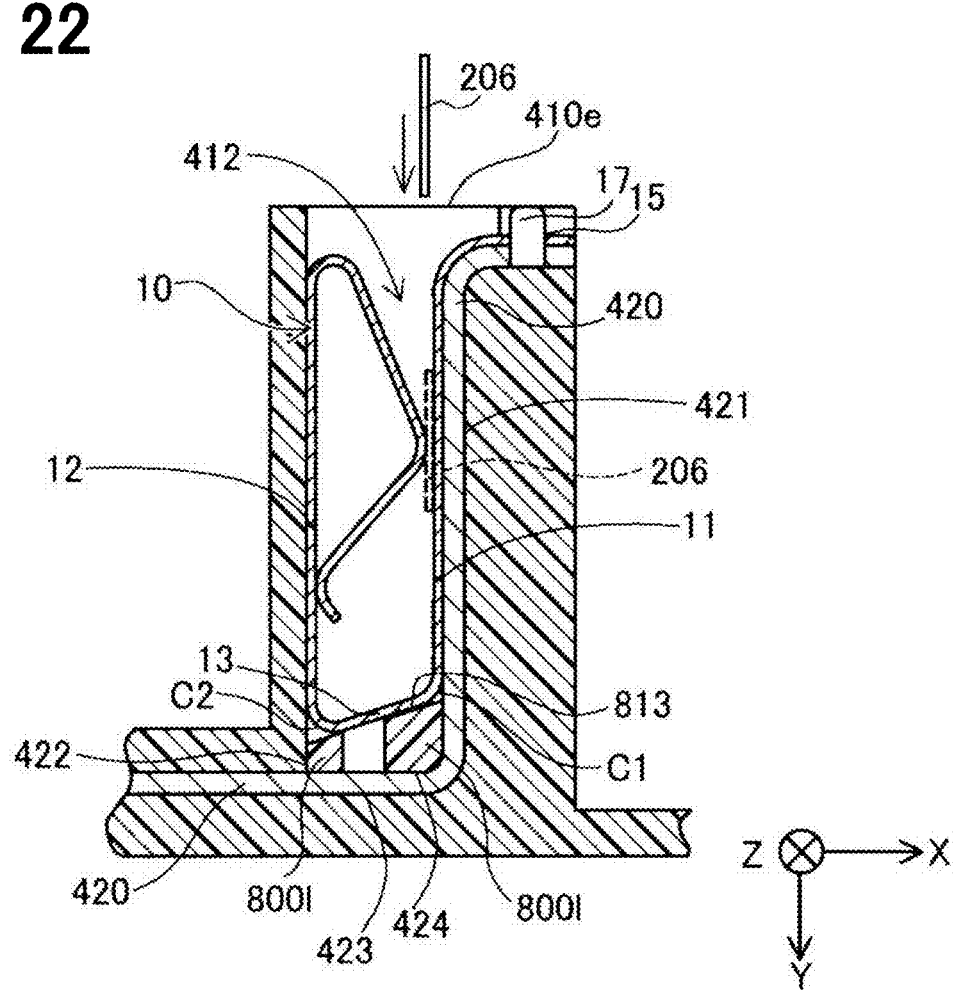
FIG. 22 is a cross-sectional view of a cover device according to another embodiment 12 of the second embodiment.
Figure 23:
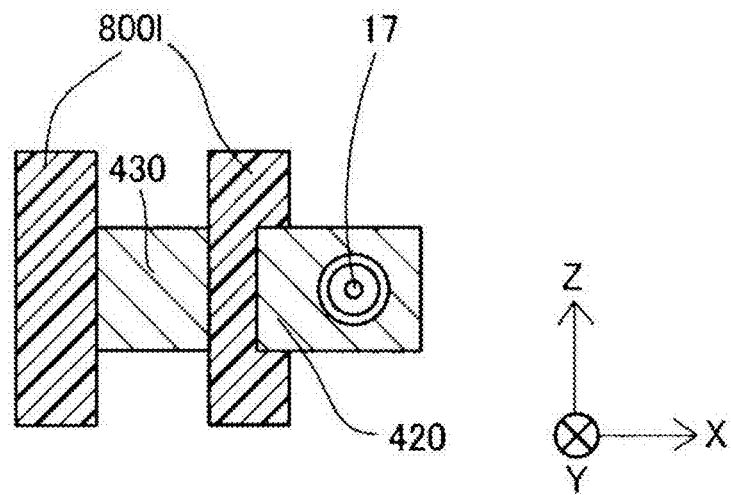
FIG. 23 is an explanatory diagram of another embodiment 12 of the second embodiment.

A cover device 410*e* of another embodiment 12 of the second embodiment shown in FIGS. 22 and 23 differs from the cover device 410*a* of the second embodiment with respect to that the cover device 410*e* includes a support member 800*l* in place of the support member 800. The support member 800*l* of the other embodiment 12 has a shape that is formed by cutting approximately one third of the support member 800 of the second embodiment which is located at the center of the support member 800 in the axial direction of the X axis. The cover device 410*e* of the other embodiment 12 of the second embodiment having the above-described structure can achieve the advantages which are similar to those of the cover devices 410, 410*a* of the first and second embodiments. In addition, in comparison to the second embodiment, the amount of resin of the support member can be reduced to suppress the manufacturing cost of the cover device 410*e*.

B2-13. (Another Embodiment 13)

Figure 24:
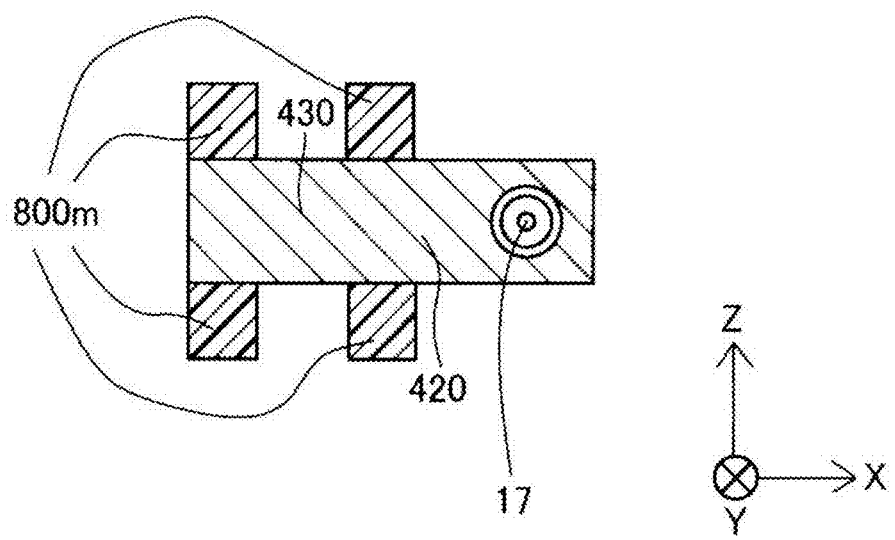
FIG. 24 is an explanatory diagram of another embodiment 13 of the second embodiment.

A support member 800*m* of another embodiment 13 of the second embodiment shown in FIG. 24 has a shape that is formed by cutting approximately one third of the support member 800*a* of the other embodiment 1 which is located at the center of the support member 800*a* in the axial direction of the X axis. The cover device of the other embodiment 13 of the second embodiment having the above-described structure can achieve the advantages which are similar to those of the cover devices 410, 410*a* of the first and second embodiments and the cover device of the other embodiment 1 of the second embodiment.

B2-14. (Another Embodiment 14)

Figure 25:
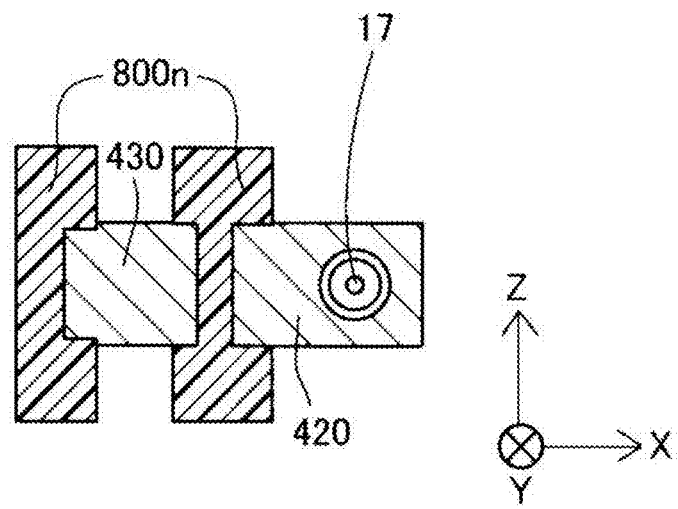
FIG. 25 is an explanatory diagram of another embodiment 14 of the second embodiment.

A support member 800*n* of another embodiment 14 of the second embodiment shown in FIG. 25 has a shape that is formed by cutting approximately one third of the support member 800 of the second embodiment which is located at the center of the support member 800 in the axial direction of the X axis.

As shown in FIG. 25, in the support member 800*n*, a center portion, which is centered in the axial direction of the Z axis, is cut in a U shape, so that the amount of resin of the support member 800*n* of the other embodiment 14 of the second embodiment is reduced in comparison to the amount of resin of the support member 800*l* of the other embodiment 12. The cover device of the other embodiment 14 of the second embodiment having the above-described structure can achieve the advantages which are similar to those of the cover devices 410, 410*a* of the first and second embodiments and the cover device of the other embodiment 12 of the second embodiment.

B2-15. (Another Embodiment 15)

Figure 26:
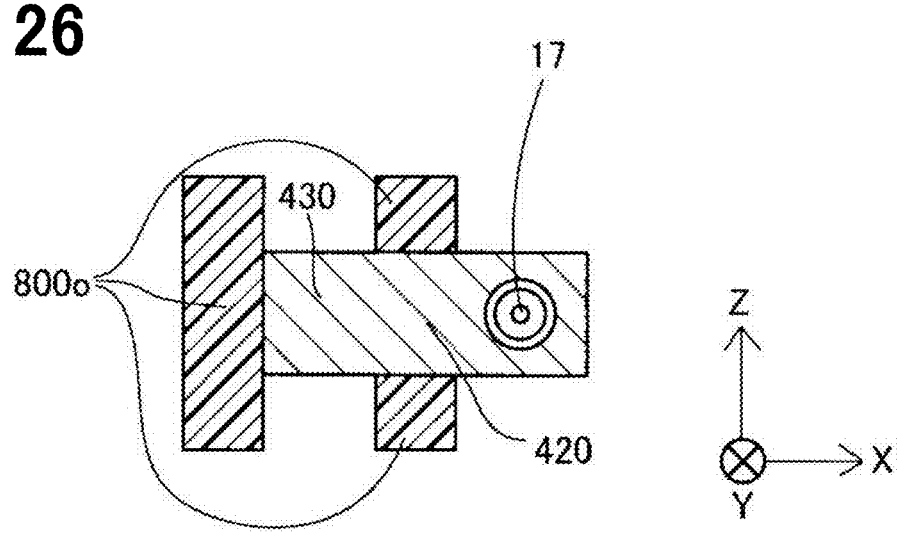
FIG. 26 is an explanatory diagram of another embodiment 15 of the second embodiment.

A support member 800*o* of another embodiment 15 of the second embodiment shown in FIG. 26 has a shape that is formed by cutting approximately one third of the support member 800c of the other embodiment 3 which is located at the center of the support member 800c in the axial direction of the X axis. The cover device of the other embodiment 15 of the second embodiment having the above-described structure can achieve the advantages which are similar to those of the cover devices 410, 410a of the first and second embodiments and the cover device of the other embodiment 3 of the second embodiment.

C. Third Embodiment

Figure 27:
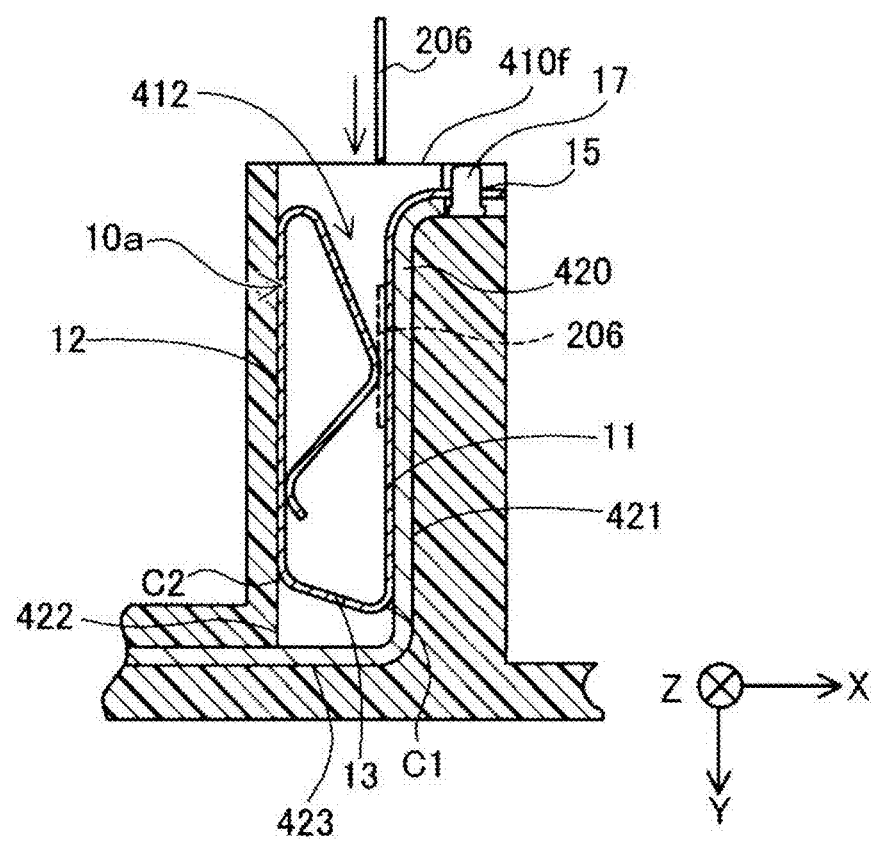
FIG. 27 is a cross-sectional view of a cover device according to a third embodiment.

As shown in FIG. 27, a structure of a cover device 410f of a third embodiment differs from the cover device 410 of the first embodiment with respect to that an angle between the first wall and the third wall of a terminal member 10a is an acute angle, and an angle between the second wall and the third wall of the terminal member 10a is an obtuse angle. The rest of the structure of the cover device 410f of the third embodiment is the same as that of the cover device 410 of the first embodiment. Therefore, the components, which are the same as those of the first embodiment, will be indicated by the same reference sings and will not be described redundantly for the sake of simplicity.

As shown in FIG. 27, the first connection C1 and the second connection C2 are respectively located at different locations in the axial direction of the Y axis. Specifically, the first connection C1 is located on a side of the second connection C2 in the +Y direction. Because of the above-described structure, the angle, which is defined between the first wall 11 and the third wall 13 at the first connection C1, is the acute angle (i.e., smaller than 90 degrees). In contrast, the angle, which is defined between the second wall 12 and the third wall 13 at the second connection C2, is the obtuse angle (i.e., larger than 90 degrees).

Because of the structure of the present embodiment shown in FIG. 27, at the time of vibrating the motor terminal 206 in the axial direction of the Y axis in response to the operation of the electric motor, when the third wall 13 is forced to swing downward about the first connection C1 by the vibration of the motor terminal 206, the third wall 13 (the second connection C2) abuts against the second inner peripheral surface 422, which is the vertical wall of the cover device 410f. Therefore, the third wall 13 cannot make further movement in the +Y direction. Thus, the vibration (the movement) of the terminal member 10a in the +Y direction is suppressed. The third wall 13 can swing about the first connection C1 in the −Y direction. However, since the movement of the third wall 13 in the +Y direction is limited, the vibration of the terminal member 10a is limited.

In the cover device 410f of the third embodiment described above, the length of the third wall 13, which is measured in the direction directed from the first connection C1, which connects between the end portion of the first wall 11 and the end portion of the third wall 13, to the second connection C2, which connects between the end portion of the second wall 12 and the end portion of the third wall 13, is longer than the distance between the first connection C1 and the second inner peripheral surface 422 and is longer than the distance between the second connection C2 and the first inner peripheral surface 421. Furthermore, the angle between the first wall 11 and the third wall 13 is the acute angle, and the angle between the second wall 12 and the third wall 13 is the obtuse angle. Therefore, when the motor terminal 206 vibrates in the inserting direction or the opposite direction opposite to the inserting direction, the second connection C2, which is the end portion of the third wall 13, abuts against the second inner peripheral surface 422, and thereby the vibration of the third wall 13 and the second wall 12 in the inserting direction (the +Y direction) is suppressed. Thus, the vibration of the terminal member 10a can be suppressed, and the wear of the cover device 410f (e.g., the wear of the terminal member 10a and the wear of the conductive member 420 in contact with the terminal member 10a) caused by the operation of the electric motor can be suppressed. In addition, in comparison to, for example, the structure where in order to suppress the vibration of the terminal member 10a, the second wall 12 is engaged to the second inner peripheral surface 422 to support the terminal member 10a at the two sides, since the above-described structure of the present embodiment can be obtained by adjusting the bending angle of the first connection C1 and the bending angle of the second connection C2 at the terminal member 10a, the manufacturing cost of the cover device 410f can be suppressed, and the ease of the assembling of the terminal member 10a into the terminal receiving portion 412 at the time of manufacturing the cover device 410f can be improved.

D. Other Embodiments Throughout Present Disclosure (D1) The cover device 410, 410a to 410f in each embodiment described above is applied to the throttle cover 400, but the present disclosure is not limited to this. For example, the cover device 410, 410a to 410f may be applied to a cover that covers only the motor terminal 206 without covering the valve opening degree sensor 300. Alternatively, the cover device 410, 410a to 410f may be applied to a cover that covers any other device instead of the valve opening degree sensor 300 together with the motor terminal 206. Furthermore, the throttle cover of the above embodiments may serve as the cover device of the present disclosure which includes the terminal receiving portion and the terminal member.

(D2) In each embodiment described above, the fifth connection C5 and the third sloped portion 143 are provided, but they may be omitted.

(D3) In each embodiment described above, the fourth connection C4 and the first wall 11 may not contact with each other in the state where the motor terminal 206 is not inserted therebetween.

(D4) In each embodiment described above, the fifth connection C5 and the second wall 12 may not contact with each other in the state where the motor terminal 206 is not inserted.

The present disclosure is not limited to the above-described embodiments and can be realized in various configurations within a range not deviating from the gist thereof. For example, it is possible to appropriately replace or combine the technical features of the respective embodiments corresponding to the technical features in the summary of the present disclosure to solve some or all of the above-mentioned disadvantages, or to achieve some or all of the above-mentioned advantages. Further, if the technical feature(s) is not described as essential in the present specification, it can be deleted as appropriate.

What is claimed is:

1. A cover device that is configured to cover a motor terminal of an electric motor and electrically connect the motor terminal to an external device, the cover device comprising:
    a terminal receiving portion that is in a form of a recess and has a plurality of inner peripheral surfaces, wherein the terminal receiving portion is configured such that the motor terminal is insertable into the terminal receiving portion, and a conductive member, which is configured to be electrically connected to the external device, is exposed at one or more of the plurality of inner peripheral surfaces; and a terminal member that is flexible and is formed by a bent metal plate, wherein the terminal member is received in the terminal receiving portion and is configured to contact a portion of the conductive member exposed at the one or more of the plurality of inner peripheral surfaces, and the terminal member comes into pressure contact with the motor terminal when the motor terminal is inserted into the terminal receiving portion, wherein:

the terminal member includes:
  a first wall that is arranged along a first inner peripheral surface, which is one of the one or more of the plurality of inner peripheral surfaces at which the conductive member is exposed;
  a second wall that is arranged along a second inner peripheral surface which is opposed to the first inner peripheral surface;
  a third wall that connects between one end portion of the first wall, which is directed in an inserting direction of the motor terminal into the terminal receiving portion, and one end portion of the second wall, which is directed in the inserting direction of the motor terminal; and
  a pressure-contact portion that is configured to urge the motor terminal against the first wall, wherein the pressure-contact portion is joined to another end portion of the second wall, which is directed in an opposite direction being opposite to the inserting direction, and the pressure-contact portion is shaped to be bent from the second wall such that the pressure-contact portion progressively approaches toward the first wall away from the second wall until a turning point and then progressively approaches back toward the second wall away from the first wall as the pressure-contact portion extends in the inserting direction;

a length of the third wall, which is measured in a direction directed from a first connection between the first wall and the third wall to a second connection between the second wall and the third wall, is longer than a distance between the first connection and the second inner peripheral surface and is longer than a length between the second connection and the first inner peripheral surface;

the second connection is placed on a side of the first connection which is opposite to the press-contact portion in the inserting direction;

an angle between the first wall and the third wall is an obtuse angle, and an angle between the second wall and the third wall is an acute angle; and the second connection is configured to be urged against the second inner peripheral surface to limit movement of the second wall in the opposite direction when the second wall is vibrated.

2. The cover device according to claim 1, further comprising a support member that is placed between a bottom of the terminal receiving portion and the third wall and has a support surface which is parallel to the third wall, wherein the support member supports the terminal member in a state where the support member is in contact with the third wall through the support surface.

3. The cover device according to claim 2, wherein:
the conductive member includes a bottom-surface exposed portion that is shaped in a strip form, wherein the bottom-surface exposed portion is arranged along the bottom and is exposed to the terminal receiving portion; and
the support member includes a pair of sub-support portions which are respectively placed on one side and another side of the bottom-surface exposed portion at the bottom.

4. The cover device according to claim 3, wherein the support member includes a connecting portion that connects between the pair of sub-support portions.

5. The cover device according to claim 1, further comprising a sensor cover portion that covers a sensor configured to sense an angle of a throttle valve to be driven by the electric motor.

6. A cover device that is configured to cover a motor terminal of an electric motor and electrically connect the motor terminal to an external device, the cover device comprising:
a terminal receiving portion that is in a form of a recess and has a plurality of inner peripheral surfaces, wherein the terminal receiving portion is configured such that the motor terminal is insertable into the terminal receiving portion, and a conductive member, which is configured to be electrically connected to the external device, is exposed at one or more of the plurality of inner peripheral surfaces; and a terminal member that is flexible and is formed by a bent metal plate, wherein the terminal member is received in the terminal receiving portion and is configured to contact a portion of the conductive member exposed at the one or more of the plurality of inner peripheral surfaces, and the terminal member comes into pressure contact with the motor terminal when the motor terminal is inserted into the terminal receiving portion, wherein:

the terminal member includes:
  a first wall that is arranged along a first inner peripheral surface, which is one of the one or more of the plurality of inner peripheral surfaces at which the conductive member is exposed;
  a second wall that is arranged along a second inner peripheral surface which is opposed to the first inner peripheral surface;
  a third wall that connects between one end portion of the first wall, which is directed in an inserting direction of the motor terminal into the terminal receiving portion, and one end portion of the second wall, which is directed in the inserting direction of the motor terminal; and
  a pressure-contact portion that is configured to urge the motor terminal against the first wall, wherein the pressure-contact portion is joined to another end portion of the second wall, which is directed in an opposite direction being opposite to the inserting direction, and the pressure-contact portion is shaped to be bent from the second wall such that the pressure-contact portion progressively approaches toward the first wall away from the second wall until a turning point and then progressively approaches back toward the second wall away from the first wall as the pressure-contact portion extends in the inserting direction;

a length of the third wall, which is measured in a direction directed from a first connection between the first wall and the third wall to a second connection between the second wall and the third wall, is longer than a distance between the first connection and the second inner peripheral surface and is longer than a length between the second connection and the first inner peripheral surface;

the cover device further comprises a support member that is placed between a bottom of the terminal receiving portion and the third wall and has a support surface which is parallel to the third wall, wherein the support member supports the terminal member in a state where the support member is in contact with the third wall through the support surface;

the conductive member includes a bottom-surface exposed portion that is shaped in a strip form, wherein the bottom-surface exposed portion is arranged along the bottom and is exposed to the terminal receiving portion; and the support member includes a pair of sub-support portions which are respectively placed on one side and another side of the bottom-surface exposed portion at the bottom.

7. The cover device according to claim 6, wherein the support member includes a connecting portion that connects between the pair of sub-support portions.

* * * * *